(12) United States Patent
Birnbaum et al.

(10) Patent No.: US 10,372,217 B2
(45) Date of Patent: *Aug. 6, 2019

(54) SYSTEMS AND METHODS FOR PROVIDING HAPTIC EFFECTS

(71) Applicant: Immersion Corporation, San Jose, CA (US)

(72) Inventors: David M. Birnbaum, Oakland, CA (US); Danny Grant, Laval (CA); Christophe Ramstein, San Francisco, CA (US); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/601,328

(22) Filed: May 22, 2017

(65) Prior Publication Data

US 2017/0308169 A1     Oct. 26, 2017

Related U.S. Application Data

(63) Continuation of application No. 13/092,484, filed on Apr. 22, 2011, now Pat. No. 9,678,569.

(Continued)

(51) Int. Cl.
*G06Q 30/02* (2012.01)
*G06F 3/01* (2006.01)
(Continued)

(52) U.S. Cl.
CPC ............ *G06F 3/016* (2013.01); *G06F 3/0488* (2013.01); *G06F 3/04845* (2013.01);
(Continued)

(58) Field of Classification Search
None
See application file for complete search history.

(56) References Cited

U.S. PATENT DOCUMENTS

| 6,161,126 A | 12/2000 | Wies et al. |
| 6,259,382 B1 | 7/2001 | Rosenberg |

(Continued)

FOREIGN PATENT DOCUMENTS

| CN | 1496549 A | 5/2004 |
| CN | 1979413 A | 6/2007 |

(Continued)

OTHER PUBLICATIONS

Shin et al., A Tactile Emotional Interface for Instant Messenger Chat, M.J. Smith, G. Salvendy (Eds.): Human Interface, Part II, HCII 2007, LNCS 4558, pp. 166-175, 2007. © Springer-Verlag Berlin Heidelberg 2007.*

(Continued)

*Primary Examiner* — David J Stoltenberg
(74) *Attorney, Agent, or Firm* — Kilpatrick Townsend and Stockton LLP

(57) ABSTRACT

Systems and methods for providing haptic effects are disclosed. For example, one disclosed system includes a computer-readable medium having program code, the program code including program code defining a haptic widget. The haptic widget includes program code defining a haptic effect; program code defining an interface for the haptic widget; program code for receiving, via the interface, a configuration of at least one parameter of the haptic widget; program code for receiving, via the interface, a play command for the haptic effect; and program code for outputting, via the interface, a signal configured to cause the haptic effect, the signal based on the at least one parameter and in response to the play command.

20 Claims, 17 Drawing Sheets

Related U.S. Application Data

(60) Provisional application No. 61/327,450, filed on Apr. 23, 2010.

(51) Int. Cl.
*G06F 3/0484* (2013.01)
*G06F 3/0488* (2013.01)
*G06F 9/451* (2018.01)
*G06Q 50/18* (2012.01)

(52) U.S. Cl.
CPC .......... *G06F 3/04883* (2013.01); *G06F 9/451* (2018.02); *G06Q 30/02* (2013.01); *G06Q 30/0241* (2013.01); *G06Q 30/0267* (2013.01); *G06Q 50/184* (2013.01)

(56) References Cited

U.S. PATENT DOCUMENTS

| | | | |
|---|---|---|---|
| 6,963,762 | B2 | 11/2005 | Kaaresoja et al. |
| 6,965,868 | B1* | 11/2005 | Bednarek ............ G06Q 30/0201 705/26.1 |
| 7,159,008 | B1* | 1/2007 | Wies .................. G06F 3/01 709/206 |
| 7,657,849 | B2 | 2/2010 | Chaudhri et al. |
| 7,779,166 | B2 | 8/2010 | Grant et al. |
| 7,934,196 | B2 | 4/2011 | Nobuyuki et al. |
| 2002/0033795 | A1 | 3/2002 | Shahoian et al. |
| 2002/0128048 | A1 | 9/2002 | Aaltonen et al. |
| 2002/0177471 | A1 | 11/2002 | Kaaresoja et al. |
| 2004/0145600 | A1 | 7/2004 | Cruz-Hernandez et al. |
| 2005/0021935 | A1 | 1/2005 | Schillings et al. |
| 2005/0251440 | A1* | 11/2005 | Bednarek ............ G06Q 30/0201 705/7.32 |
| 2006/0015560 | A1 | 1/2006 | MacAuley et al. |
| 2006/0066569 | A1 | 3/2006 | Eid et al. |
| 2006/0136631 | A1 | 6/2006 | Eid et al. |
| 2006/0209037 | A1 | 9/2006 | Wang et al. |
| 2007/0101279 | A1 | 5/2007 | Chaudhri et al. |
| 2008/0168368 | A1 | 7/2008 | Louch et al. |
| 2008/0209037 | A1 | 8/2008 | Zernik et al. |
| 2008/0300055 | A1 | 12/2008 | Lutnick et al. |
| 2009/0248883 | A1 | 10/2009 | Suryanarayana et al. |
| 2009/0322498 | A1 | 12/2009 | Yun et al. |
| 2010/0123588 | A1* | 5/2010 | Cruz Hernandez .......................... A61B 5/02438 340/573.1 |
| 2010/0138763 | A1 | 6/2010 | Kim |
| 2010/0231541 | A1 | 9/2010 | Cruz-Hernandez et al. |
| 2011/0063208 | A1* | 3/2011 | Van Den Eerenbeemd ................ G06F 3/011 345/156 |

FOREIGN PATENT DOCUMENTS

| | | |
|---|---|---|
| CN | 101305416 A | 11/2008 |
| JP | 2001-296941 | 10/2001 |
| JP | 2001-296949 | 10/2001 |
| JP | 2001296941 A | 10/2001 |
| JP | 2002-116836 | 4/2002 |
| JP | 2002-218555 | 8/2002 |
| JP | 2003-076915 | 3/2003 |
| JP | 2003-323569 | 11/2003 |
| JP | 2006-163206 | 6/2006 |
| JP | 2006-163579 | 6/2006 |
| JP | 2008-070983 | 3/2008 |
| JP | 2009-508446 | 2/2009 |
| KR | 10-2008-0041293 | 5/2008 |
| KR | 1020100000742 | 1/2010 |
| WO | WO 02/03172 | 1/2002 |
| WO | WO 2007/033244 | 3/2007 |
| WO | WO 2008/037275 | 4/2008 |
| WO | 2009/114239 A1 | 9/2009 |
| WO | WO 2010/035670 | 4/2010 |

OTHER PUBLICATIONS

EP 11718590.0, "Communication Pursuant to Article 94(3) EPC", May 23, 2018, 4 pages.
Japanese Patent Application No. JP 2016-506323, Pre-Appeal Examination Report dated Mar. 22, 2016.
Japanese Patent Application No. JP 2015-103030, Decision of Rejection dated Nov. 8, 2016.
Japanese Patent Application No. JP 2016-035738, Office Action dated Jan. 31, 2017.
Japanese Patent Application No. JP 2016-035738, Office Action dated May 16, 2017.
Japanese Patent Application No. JP 2013-506323, Decision of Rejection dated Oct. 27, 2015.
Japanese Patent Application No. JP 2013-506232, Notice of Reasons for Rejection dated Jan. 20, 2015.
Chinese Patent Application No. 201180020519, Notification of Third Office Action dated Mar. 18, 2016.
Chinese Patent Application No. 2011800250519, Notification of Second Office Action dated Aug. 28, 2015.
Chinese Patent Application No. 201180020519, Notification of First Office Action dated Dec. 29, 2014.
International Patent Application No. PCT/US2011/033576, International Preliminary Report on Patentability dated Nov. 1, 2012.
International Patent Application No. PCT/US2011/033576, International Search Report and Written Opinion dated Jun. 21, 2012.
Korean Patent Application No. 10-2012-7030612, Notice of Preliminary Rejection dated May 24, 2017.
CN 201610143217.7, "Office Action", dated Aug. 17, 2018, 15 pages.
KR 10-2018-7012236, "Office Action", dated Jun. 27, 2018, 13 pages.
European Patent Office Application No. 11718590.0, Communication Pursuant to Article 94(3) EPC dated Oct. 12, 2017, 5 pages.
CN 201610143217.7, "Office Action", dated Feb. 24, 2018, 14 pages.
Chinese Application CN201610143217.7, "Office Action", dated Nov. 8, 2018, 10 pages.
Korean Application KR10-2018-7012236, "Office Action", dated Dec. 24, 2018, 5 pages.
Korean Application No. KR10-2018-7012236, "Office Action", dated Mar. 20, 2019, 13 pages.

\* cited by examiner

400

1.  10MP Digital Camera with 3.6 Optical Zoom and 3 inch LCD
Buy new: Click for product details
Get it by Friday, Mar 5 if you order in the next 7 hours and choose one-day shipping
☆☆☆☆☆ ☐ (191)
Electronics: See at 215,195 items    402

2. 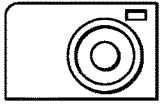 Camera & Photo Store
   Digital Point & Shoot Cameras
   Computer Memory Cards
   Camera Cases & Bags    404
   Camera Batteries 414
3.  10.2MP Digital Camera with 3x Optical Zoom and 2.4
Buy new: Click for product details
Get it by Friday, Mar 5 if you order in the next 6 hours and choose one-day shipping
☆☆☆☆☆ ☐ (58)
Electronics: See at 215,195 items    406

4.  MP Digital Camera with 3x Optical Image Stat
$149.00
Friday, Mar 5 if you order in the next 6 hours and choose one-day shipping
☐ (466)
See at 215,195 items    408

5. 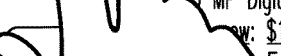 Digital Camera with 5x Optical Zoom
$176.45
by Friday, Mar 5 if you order in the next 5 hours and choose one-day shipping
☆☆☆☆☆ ☐ (89)
Electronics: See at 215,195 items    410

6.  12.2 MP Digital SLR Camera with EF-S 18-55mm
Buy new: Click for product details
Get it by Friday, Mar 5 if you order in the next 6 hours and choose one-day shipping
☆☆☆☆☆ ☐ (627)
Electronics: See at 215,195 items    412

FIG. 4

SYSTEMS AND METHODS FOR PROVIDING HAPTIC EFFECTS

CROSS-REFERENCES TO RELATED APPLICATION

This application is a continuation of and claims priority to U.S. patent application Ser. No. 13/092,484, filed Apr. 22, 2011 and entitled "Systems and Methods for Providing Haptic Effects," and to U.S. Provisional Patent Application No. 61/327,450, filed Apr. 23, 2010, entitled "Systems and Methods for Use of Haptic Effects in Promotional and Other Communications," the entirety of both of which are hereby incorporated by reference.

FIELD OF THE INVENTION

The present application relates generally to providing haptic effects and more particularly relates to providing haptic effects using haptic widgets or associated with brands or advertisements.

BACKGROUND

Haptically-enabled devices can be used to enhance user experiences with various devices. However, there remains room for improvement in the use of haptics. For example, a typical use of haptics may include the use of haptic feedback to simulate the feel of an object or allow realistic physical interactions with a virtual environment. However, haptics may provide benefits unrelated to the accurate representation of a physical object in a haptic context.

SUMMARY

Embodiments of the present invention provide systems and methods for providing haptic effects. For example, in one embodiment, a computer-readable medium comprises program code, the program code comprising program code defining a haptic widget. The haptic widget comprises program code defining a haptic effect; program code defining an interface for the haptic widget; program code for receiving, via the interface, a configuration of at least one parameter of the haptic widget; program code for receiving, via the interface, a play command for the haptic effect; and program code for outputting, via the interface, a signal configured to cause the haptic effect, the signal based on the at least one parameter and in response to the play command.

This illustrative embodiment is mentioned not to limit or define the invention, but rather to provide an example to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIGS. 3A-C and 4 show systems for providing brand-specific haptic effects according to embodiments of the present invention;

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations.

Illustrative Device for Providing Haptic Feedback

Figure 1A:
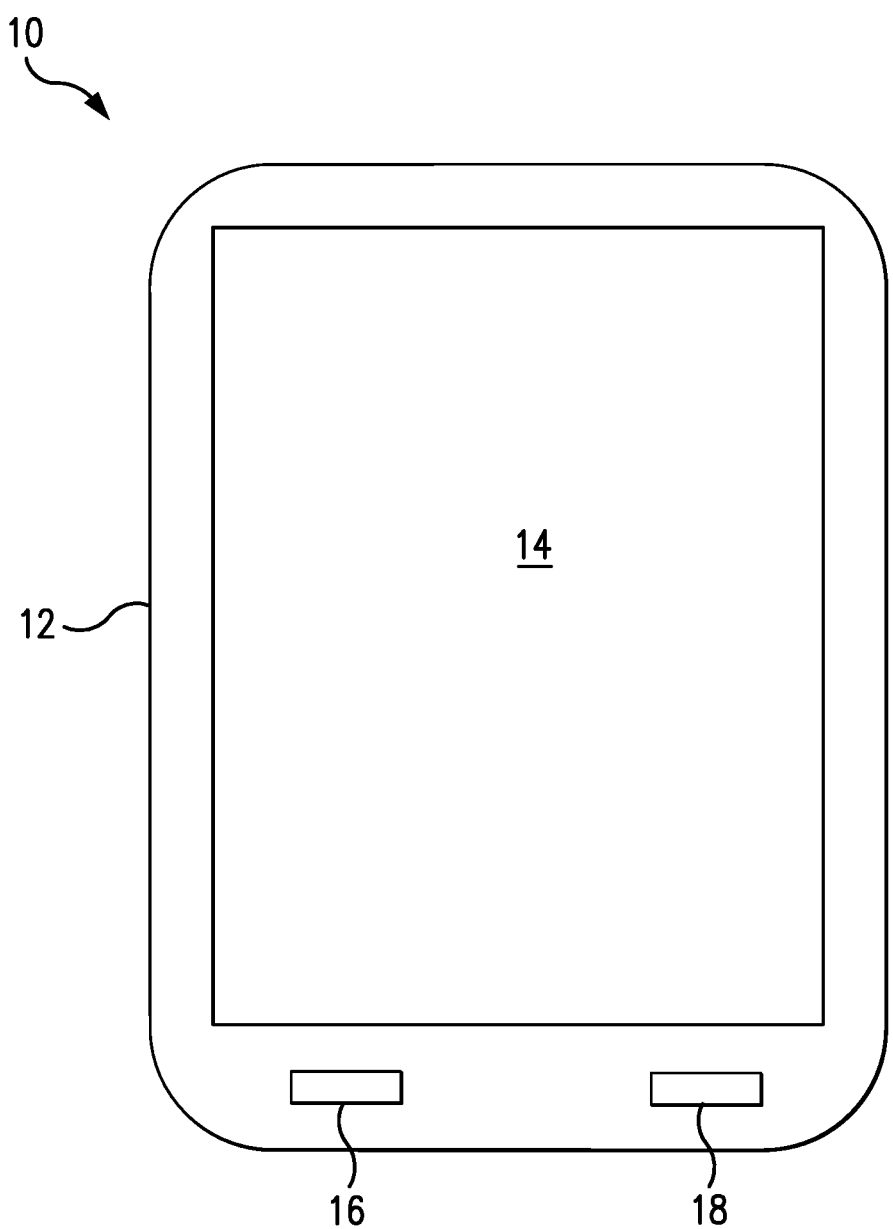
FIGS. 1A-D show systems for providing haptic effects according to embodiments of the present invention.

One illustrative embodiment of the present invention comprises a portable computing device 10 as shown in FIG. 1A. The device 10 has a housing 12 and a touch-sensitive input device 14 incorporated into a display. In addition, two buttons 16, 18 are provided on the housing. Within the device 10, but not shown, are a processor and a memory for executing software code. In addition, a plurality of actuators are disposed within the device for outputting haptic effects to the device 10, the touch-sensitive input device 14, or the buttons 16, 18.

The device 10 shown in FIG. 1 is configured to provide haptic effects in a number of different circumstances. For example, when the device 10 is powered on, a logo for the device's manufacturer or service provider is displayed. In addition, a brand-specific haptic effect is output (or "played") by one or more of the actuators. For example, Electronics Company Inc. (ECI) (a fictitious company for this example) may provide the device 10 and configure the device 10 to display ECI's logo while booting. In addition, ECI incorporates program code within the device's memory to cause the device's actuators to play a haptic effect that is associated with ECI's brand, referred to as a haptic brand or brand-specific haptic effect. Thus, a user of ECI devices that play ECI's brand-specific haptic effect may come to associate the brand-specific haptic effect with ECI.

Further, once the device 10 has booted, it is configured to provide a variety of haptic effects based on user input or content displayed on the screen. For example, the touch-sensitive input device 14 is a multi-touch touch-sensitive input device capable of detecting multiple substantially simultaneous contacts and provide position information for each contact. Thus, based on a user's interaction with the touch-sensitive input device 14, the device's processor is capable of generating haptic effects based on the multi-touch inputs. The device 14 is further capable of determining gestures based on the multi-touch inputs and generating haptic effects based on such gestures.

During operation, the device 10 is capable of executing programs, such as an operating system or a web browser. Each of these programs may have various haptic functionalities associated with it. In various embodiments disclosed herein, the haptic functionality may be incorporated into well-defined interface elements referred to as "widgets." Haptic widgets may be associated with various operating system functions, icons shown on the display, or different GUI elements of the various programs available to be executed. The widgets may provide well-defined haptic functionality that can be easily associated with or disassociated from various aspects of the operating system or applications to more easily provide haptic feedback functionality.

In addition to interacting with an operating system or various applications, a user may view content provided by such applications. For example, a user can use the device 10 to execute a web browser for navigating to various websites on the World Wide Web (the "Web"). Some of these websites display advertisements or brands for various companies. Device 10 is configured to output brand-specific haptic effects for brands that are displayed on the display, such as within a website. In addition, advertisements incorporated within various applications or websites may cause the device 10 to output haptic effects, for example to attract the attention of the user to the advertisement or to encourage the user to interact with the advertisement. In addition, the device 10 may output different haptic effects based on a user's interaction with an advertisement or a brand.

In this illustrative embodiment, if a user interacts with an advertisement, the device 10 outputs positive haptic effects designed to encourage the user to continue to interact with the advertisement, to interact with advertisements from the same company again in the future, or to reward the user for having interacted with the advertisement. Alternatively, the device 10 outputs negative haptic effects if the user attempts to close or hide an advertisement to discourage the user from performing such actions or, if the user completes the action, to discourage the user from performing such actions in the future.

In addition a user may interact with a brand or logo that is shown on the display, such as within a web page. For example, a user may touch or perform a gesture on an image associated with a brand, which causes the device 10 to output a haptic effect associated with the gesture or the brand. Or by touching the image, performing gestures on or towards the image, or otherwise interacting with the image, it may cause the image to change its appearance, such as by executing an animation of the image. During such an animation, the device 10 outputs haptic effects corresponding to different portions of the animation, such as footsteps if the animated image walks on the screen or vibrations corresponding to an orange being peeled. In addition, the user may be able to interact with the image by performing gestures, including multi-touch gestures, on the image to "push" or "pull" or "twist" the image, resulting in different displayed and haptic responses.

Thus, the device 10 provides a richer haptic experience for a user by providing haptic widgets and interactive brand and advertising experiences.

Figure 1B:
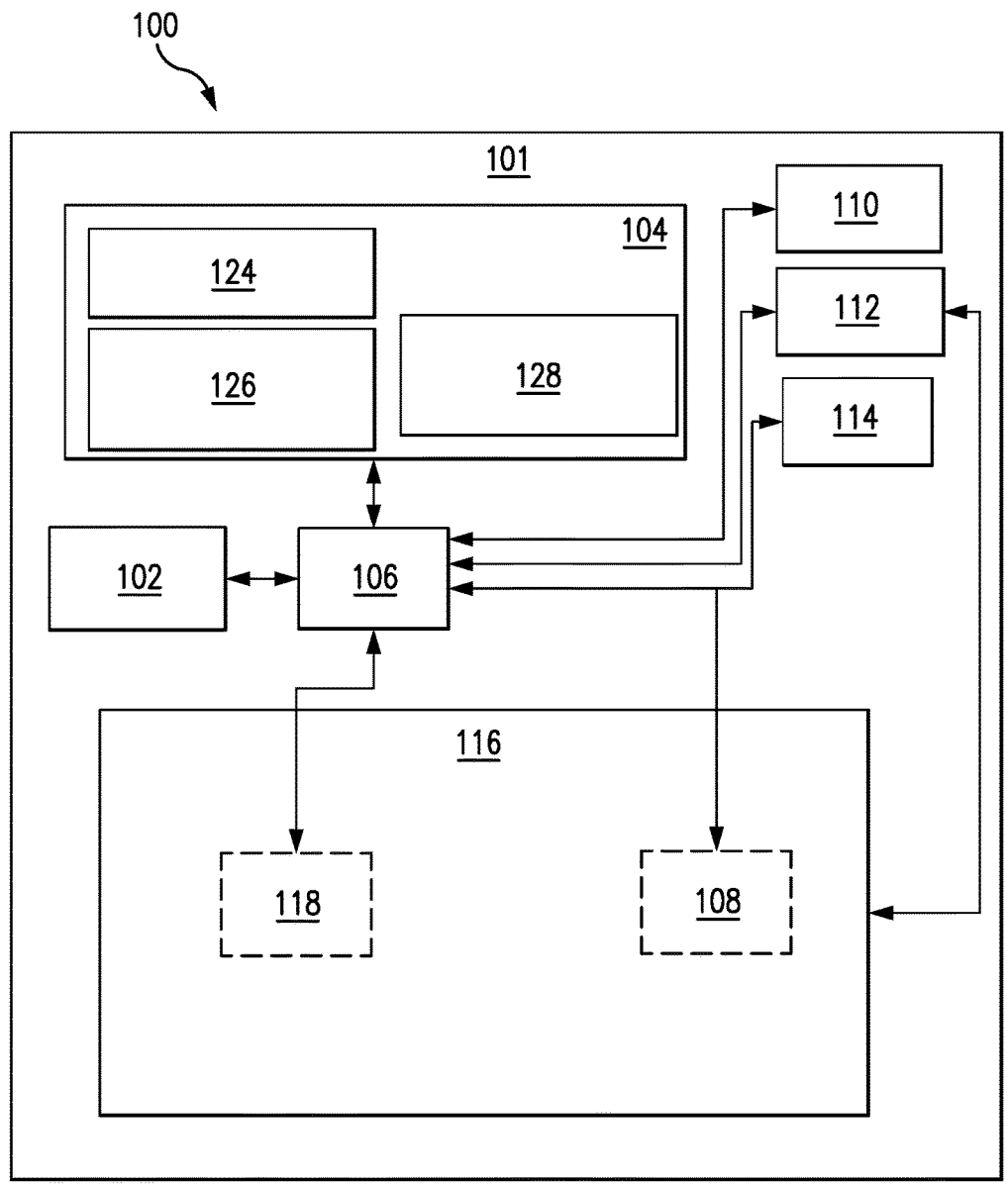

Referring now to FIG. 1B, FIG. 1B shows an illustrative system 100 for providing one or more haptic effects. Particularly, in this example, system 100 comprises a computing device 101 featuring a processor or processors 102 interfaced with other hardware via bus 106. The processor may include a CPU or other specialized processors, such as a GPS receiver, digital signal processor, or others that are more fully described below. A memory 104, which can comprise any suitable tangible computer-readable medium such as RAM, ROM, EEPROM, or the like, is configured to store program components that configure operation of the computing device. In this example, computing device 101 further includes one or more network interface devices 110, input/output (I/O) interface components 112, and additional storage 114.

Different embodiments of the system 100 shown in FIG. 1B may be configured in different ways. For example, in one embodiment, the components of system 100 may be entirely disposed within a single housing, such as within a cell phone, a handheld PDA, a tablet computer, or a laptop computer. In another embodiment, the components of system 100 may be disposed within a plurality of housings, such as in a desktop computer with a separate display or displays and input device(s).

Network device(s) 110 can represent any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as a one or more displays, keyboards, mice, speakers, microphones, and/or other hardware used to input data or output data. Storage 114 represents nonvolatile storage such as magnetic, optical, or other storage media included in device 101.

System 100 further includes a touch surface 116, which is in this example integrated into device 101. Touch surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as touch pressure. As another example, optical sensors may be used to determine the touch position.

In one embodiment, a sensor is configured to detect movements and changes in orientation of the system. Part or all the sensor or a plurality of sensors, may be located internal or external to the device and may be contacted by a user. The sensor can comprise a gyroscopic sensor capable of detecting motion along three translational axes and in rotation about the three translational axes. However, in other embodiments, other suitable sensors may be employed, such as one or more accelerometers for detecting translational or rotational movement along or about one or more axes. Another suitable sensor may comprise a receiver for receiving input from an external source, such as a light or radio source for determining a position of the device, a rotary velocity sensor, light sensor, pressure sensor, texture sensor, camera, microphone, or other type of sensor. The sensor(s) may be used to determine movement of the device and/or other manipulations of the device for use in controlling the device, selecting options, etc.

In this example, an actuator 118 in communication with processor 102 and is coupled to touch surface 116. In some embodiments, actuator 118 is configured to output a haptic effect varying a coefficient of friction of the touch surface in response to a haptic signal. Additionally or alternatively, actuator 118 may provide haptic effects that move the touch surface in a controlled manner. Some haptic effects may utilize an actuator coupled to a housing of the device, and some haptic effects may use multiple actuators in sequence and/or in concert. For example, the coefficient of friction can be varied by vibrating the surface at different frequencies. Different combinations/sequences of variance can be used to simulate the feeling of a texture. For example, the touch interface may include a polymorphic surface whose micro and/or macro surface features can be configured or changed dynamically. Other haptic effects may be provided completely independently of the surface, such as vibrotactile effects provided using a rotating motor, linear resonant actuator, or other actuator(s) coupled to the device body.

Although a single actuator 118 is shown here, embodiments may use multiple actuators of the same or different type. For example, a piezoelectric actuator is used in some embodiments to displace some or all of touch surface 116 and/or another portion of the device vertically and/or horizontally at ultrasonic frequencies. In some embodiments, multiple actuators such as eccentric rotating mass motors and linear resonant actuators can be used alone or in concert to provide different textures, friction variances, and other haptic effects. Other examples of suitable actuators include electric motors, electro-magnetic actuators, voice coils, electroactive polymers, shape memory alloys, solenoids, microfluidic actuators, and/or electrostatic or magnetostrictive actuators, which may be used alone or in combination with actuators of the same or different types.

Although several haptic effects are discussed along with use of an actuator to provide outputs, some haptic effects are generated by altering responses by the device to haptic inputs, with the haptic effect comprising, for example, a change in the response of a device to touch inputs, gestures, or manipulation.

Turning to memory 104, exemplary program components 124, 126, and 128 are depicted to illustrate how a device can be configured in some embodiments to provide haptic effects. In this example, a detection module 124 configures processor 102 to monitor touch surface 116 via sensor(s) 108 to determine a position of a touch or multiple substantially simultaneous touches or to otherwise determine an event or condition calling for a haptic effect. For example, module 124 may sample sensor 108 in order to track the presence or absence of a touch and, if a touch is present, to track the location, path, velocity, acceleration, pressure and/or other characteristics of the touch or touches over time. As another example, module 124 may determine that an advertisement is in progress and provide haptic effects keyed to activity occurring in the advertisement and/or in response to user interaction (or lack thereof) with the advertisement. As a further example, a position sensor may detect changes in the device location, inclination, etc. and process such changes as an input for use in interacting with the advertisement or other content.

Haptic effect determination module 126 represents a program component that analyzes data regarding touch characteristics or operational conditions or events to select a haptic effect to generate. For example, in some embodiments, an input gesture comprising a multi-touch input or a sequence of one or more touches may be recognized and correlated to one or more haptic effects. As another example, some or all of the area of touch surface 116 may be mapped to a graphical user interface. Different haptic effects may be selected based on the location of a touch in order to simulate the presence of a feature by varying the friction of touch surface 116, providing a vibration, and/or other effect(s) so that the feature is "felt" when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to actuator(s) 118 to generate the selected haptic effect or to otherwise provide a haptic effect by adjusting device responses to haptic inputs. For example, generation module 128 may access stored waveforms or commands to send to actuator 118. As another example, haptic effect generation module 128 may utilize signal processing algorithms to generate an appropriate signal to send to actuator(s) 118. As a further example, a desired texture may be indicated along with target coordinates for the texture and an appropriate waveform sent to one or more vibrotactile actuators to generate appropriate displacement of the surface (and/or other device components) to provide the texture.

In this example, local program components are used to determine and generate the haptic effect. However, embodiments include those that utilize a remote resource. For example, a web page may include haptic effects included in accordance with aspects of the present subject matter. Additionally or alternatively, haptic effects may be provided at one device in response to communication with another computing device.

Figure 1C:
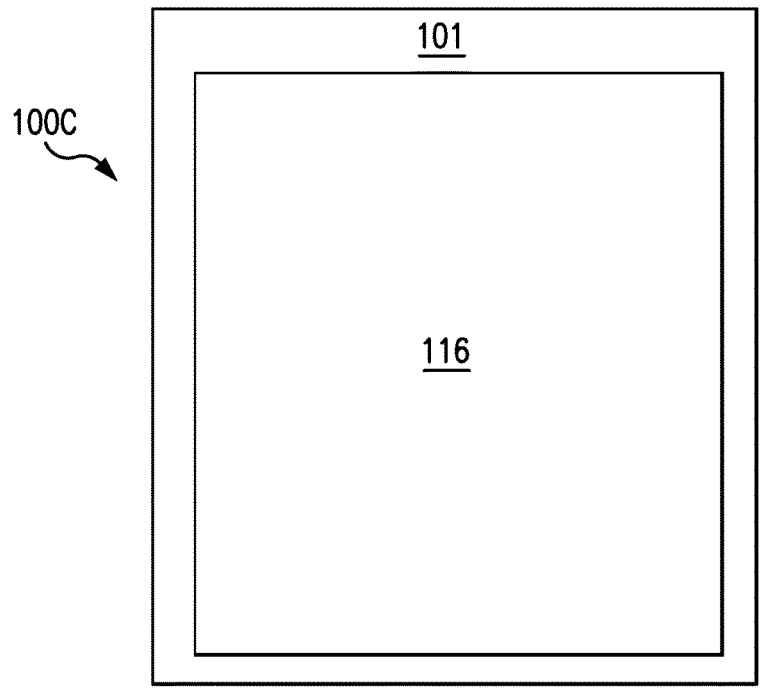
Figure 1D:
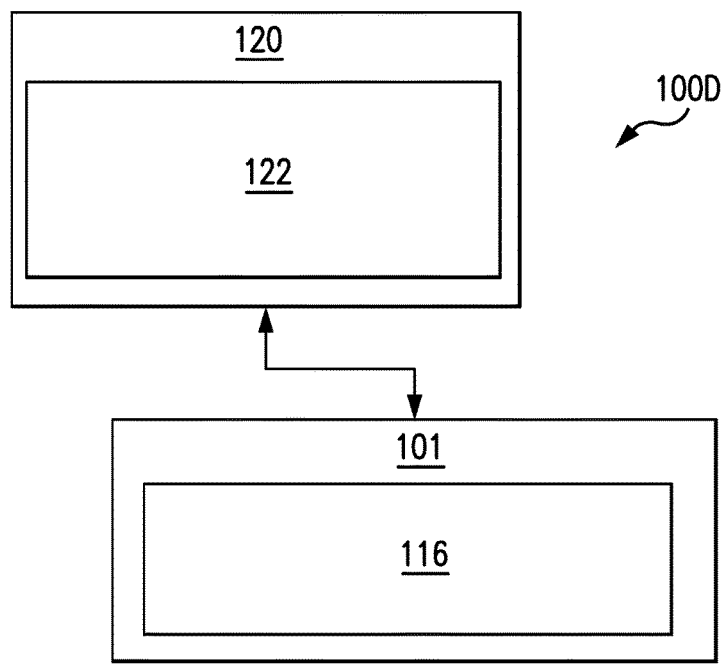

A touch surface may or may not overlay (or otherwise correspond to) a display, depending on the particular configuration of a computing system. In FIG. 1C, an external view of a computing system 100B is shown. Computing device 101 includes a touch-enabled display 116 that combines a touch surface and a display of the device. The touch surface may correspond to the display exterior or one or more layers of material above the actual display components. FIG. 1D illustrates another example of a touch-enabled computing system 100C. In this example, a computing device 101 features a touch surface 116 which is mapped to a graphical user interface provided in a display 122 that is included in computing system 120 interfaced to device 101. For example, computing device 101 may comprise a mouse, trackpad, or other device, while system 120 may comprise a desktop or laptop computer, set-top box (e.g., DVD player, DVR, cable television box), or another computing system. As another example, touch surface 116 and display 122 may be included in the same device, such as a touch-enabled trackpad in a laptop computer featuring display 122.

In some embodiments, a position of a touch within a touch area defined by the touch surface can be returned and then converted to one or more pixel addresses. The value or values associated with the pixel address(es) can be accessed and used to drive the actuator(s) of the haptic device (including a variable friction device or other devices). For instance, each pixel address may be associated with an intensity value that is correlated to an amplitude level with which a piezoelectric or other actuator is to be driven. As a more complex example, each pixel address may be associated with three intensity values (i.e., RGB). Each of the three intensity values can be associated with a different actuator intensity in some embodiments. As another example, some values may specify intensity and others specify duration of operation. As a further example, different pixel intensity values may be correlated to different desired textures or components used to drive actuators to simulate a single texture. Still further, a multilayer RGB image file may be used, with each layer corresponding to a particular actuator.

The mapping between the touch surface and graphical user interface may be absolute or may be scaled. For example, in some embodiments, a touch location is directly correlated to a corresponding pixel address (or pixel addresses), with the associated values used in selecting haptic effects to drive the actuator(s). In other embodiments, the touch location and velocity is considered.

As another example, a current or projected location of a touch can be compared to data identifying the location of GUI features such as controls, textual content, boundaries, an advertisement, and the like. Then, if a GUI feature is identified at the location, data associating one or more haptic effects to the feature can be accessed. For instance, a processor may track the location of a touch and determine the touch is at or approaching a position in the touch area mapped to a particular control (e.g., a button) in the graphical user interface. The processor can then consult a listing of interface elements to determine a haptic effect (e.g., a texture, a friction variation) associated with the button and, based on the haptic effect, take further actions to generate the haptic effect.

To generate the haptic effect(s), a processor can access or generate one or more haptic signals. For example, a processor may access drive signals stored in memory and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

In some embodiments, a baseline haptic signal may be sent to the actuator(s) to generate an ambient haptic effect even in the absence of a selected haptic effect in order to enhance the range of potential effects the device can produce. Thus, transmitting a haptic signal may comprise sending a "stop" command, a "zero" or minimal signal, or another signal to the actuator to reduce intensity as appropriate.

As an example, use of certain actuators, such as piezoelectric actuators, may allow for reduction in the coefficient of friction of a touch surface but not an increase in the coefficient of friction. To provide a range of options, a baseline signal may be provided so that the "ordinary" friction level of the touch surface is below the coefficient of friction the touch surface would have when static. Accordingly, haptic effects may be defined with respect to the baseline, rather than static, value. If maximum friction is desired, a "zero" signal may be sent to the piezoelectric actuator to stop movement of the surface.

Whether integrated with a display or otherwise, the discussion of 2-D rectangular and other touch surfaces in the examples herein is not meant to be limiting. Other embodiments include curved or irregular touch-enabled surfaces that are further configured to provide surface-based haptic effects. Additionally, although a touch surface and surface-based haptic effects are noted above, aspects of the present invention can be used independently of a touch surface, and can even find application in providing haptic effects for devices that are not touch-enabled. Whether or not a touch-enabled device is used, embodiments may or may not include surface-based haptic effects.

Examples of hardware architecture for providing various haptic effects have been provided above. Next, the disclosure turns to exemplary embodiments of use of haptic effects. The headings below are not meant to be limiting—the various embodiments discussed below may be used independently or in any suitable combination with one another.

Haptic Widgets

Figure 2A:
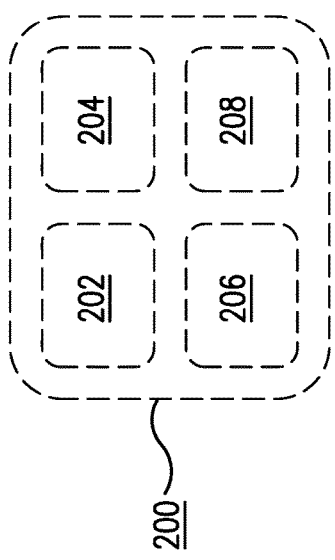
FIGS. 2A-D show haptic widgets according to embodiments of the present invention.

Referring now to FIG. 2A, FIG. 2A shows a haptic widget 200 according to one embodiment of the present invention. The widget 200 is shown as having a dashed boundary as the widget 200 shown in this embodiment is not visible to a user; however, it is configured to provide haptic functionality to applications or interface elements that are associated with the widget. However, in some embodiments, a haptic widget may be visible, such as when provided to a user as an option for a haptic effect or simply to provide a visible indication of a location a haptic effect or to provide an audiovisual effect corresponding to a haptic effect.

A widget may be generally understood as an interface element that embodies particular functionality, such as a button or scroll bar, that has a well-defined interface, such as an application programming interface (API), for receiving inputs and providing outputs. A widget may be its own self-contained module of executable code or may be incorporated within a larger software application directly or as a part of a library (e.g. a dynamically-linked library).

The haptic widget 200 shown in FIG. 2A comprises functionality that may be used by software to provide a particular haptic effect or haptic effects. For example, a haptic widget may be created and provided by a company, such as ECI, as a brand-specific haptic widget. The widget 200 may comprise a plurality of different haptic effects 202-208 as well as other functionality, such as configuration functions and parameters. And while the embodiment shown in FIG. 2A shows a haptic widget 200 comprising four haptic effects 202-208, any number of haptic effects may be included depending on the particular requirements of a widget according to an embodiment of the present invention. In the embodiment shown, haptic widget 200 is a brand-specific haptic widget and comprises a plurality of brand-specific haptic effects 202-208. Each haptic effect 202-208 is a brand-specific haptic effect that may be output or played based on inputs received by the widget. For example in one embodiment and referring again to the device 10 of FIG. 1A, the brand-specific haptic widget 200 comprises a brand-specific haptic effect 202 to be played at startup and a brand-specific haptic effect 204 to be played at shutdown. In addition, the haptic widget 200 comprises a brand-specific haptic effect 206 configured to be played when device 10 enters a sleep or into a hibernate mode, and another brand-specific haptic effect 208 configured to be played when device 10 "wakes up" from a sleep or hibernate mode. Each of these brand-specific haptic effects 202-208 may be associated with ECI's branded devices and provide common haptic effects across the different devices that provide a haptic association with ECI to the user. In addition, some of the brand-specific haptic effects may provide other indications, such as the status of the device, e.g. startup.

As discussed above, a haptic widget 200 provides a well-defined interface. FIG. 2D shows a more detailed view of haptic widget 200, including its interface 220. In the embodiment shown in FIG. 2D, the haptic widget 200 comprises a plurality of haptic effects 202-208, at least one configuration parameter 210, an image 212, a sound 214, and an interface 220. In the embodiment shown in FIG. 2D, various functionality provided by the haptic widget is only available by using the interface 220. The interface 220 can be used or invoked by an application, an operating system, or other executable code to use various functionality defined within the widget. In some embodiments, the interface may comprise one or more executable functions comprising an API. In some embodiments, the interface 220 may be configured to receive messages passed via a messaging protocol or other mechanisms.

For example, in the embodiment shown in FIG. 2D, the interface 220 is configured to receive signals configured to change or retrieve the configuration parameter 210, receive a signal to play one or more of the haptic effects 202-208 and to output a signal configured to cause the played haptic effect or haptic effects 202-208, receive a signal to output the image 212 and to output a signal configured to cause the image 212 to be displayed, and receive a signal to output the sound 213 and to output a signal configured to cause the sound 214 to be played. In some embodiments, the interface 220 may be configured to receive other commands, such as activation or deactivation commands. In one embodiment, an activation command may be configured to activate the haptic widget or to activate one or more of the haptic effects 202-208, the image 212, or the sound 214. Similarly, a deactivation command may be configured to deactivate the haptic widget or to deactivate one or more of the haptic effects 202-208, the image 212, or the sound 214

In the embodiment shown in FIG. 2D, the widget 220 is defined as an object class containing a plurality of other object classes, such as object classes defining or storing information about the various haptic effects 202-208, the image 212, the sound 214, and the configuration parameter(s) 210. In some embodiments, the haptic widget 220 may comprise references to one or more other objects or may instantiate objects corresponding to object classes as needed to provide the widget's functionality. However, other programming paradigms besides the object-oriented paradigm may be used to define haptic widgets. Thus, haptic widgets according to some embodiments of the present invention may be defined according to other programming paradigms.

To use the widget's functionality, executable code invokes the widget 200 by interacting with its interface 220. For example, in one embodiment of the present invention, an operating system of a handheld device, such as a smartphone, is configured to associate haptic widgets with applications or other widgets available to a user of the smartphone. When the operating system determines that a user has executed an application, the operating system identifies a haptic widget 200 associated with the application and invokes the haptic widget's interface 220 to cause the haptic widget 200 to generate a signal to output a haptic effect. The operating system receives the signal from the haptic widget 200 via the interface 220 and generates an actuator signal based on the signal, where the actuator signal is configured to cause an actuator within the smartphone to output a haptic effect. In some embodiments, the operating system may generate a haptic effect based on the signal using an electrostatic device.

For example, an illustrative widget interface may include configuration functions, activation or deactivation functions, input functions, registration functions and corresponding outputs for one or more of such interface functionality. For example, in one embodiment, a widget may comprise activation and deactivation functions. In such an embodiment, portions of or all of the functionality of a haptic widget may be activated or deactivated. For example, the haptic widget 200 shown in FIG. 2D may be installed on a smartphone as a trial version and thus is installed in a partially disabled state wherein one of the haptic effects 202 is enabled, while the remainder 204-208 are disabled. In such an embodiment, a user of the smartphone may obtain only limited functionality of the widget 200. However, if the user were to subscribe to a service or pay a fee to activate the widget 200, an activation command may be sent to the widget 200. Upon receiving the activation command, the widget 200 may change one or more configuration parameters, such as an "enabled" state of the haptic effects 202-208 as well as a parameter indicating the state of the widget (e.g. a change to "active" from "trial"). After successful activation, the widget 200 may output a signal indicating that the widget has been activated or that activation was only partially successful or unsuccessful.

At a later date if the user terminates a service associated with the widget 200 or simply desires to deactivate the widget 200, a deactivation command may be sent to the widget 200 to disable the widget 200. Upon receipt of such a command, the widget 200 may change one or more configuration parameters, such as by setting an "enabled" state of the haptic effects 202-208 to "disabled" as well as a parameter indicating the state of the widget (e.g. a change to "disabled" from "trial" or "active"). After successful deactivation, the widget 200 may output a signal indicating that the widget has been deactivated or that deactivation was only partially successful or unsuccessful.

In some embodiments, haptic widgets may comprise one or more authentication functions or parameters. For example, a distributor of haptic widgets may wish to ensure that a widget has been appropriately licensed before allowing it to be activated. In such a case, a haptic widget may require an authentication code upon activation or deactivation. Further, a haptic widget may be configured to transmit a signal to a remote device to verify that activation or deactivation has been properly authorized.

Similarly, a haptic widget 200 may be configured to provide an identification or verification of authenticity based on a received command. For example, in one embodiment, a creator of haptic widgets may embed a configuration parameter within its widgets to verify their authenticity or to allow their authenticity to be verified. For example, in one embodiment, a haptic widget may be distributed with a digital signature. In such an embodiment, a user may be able to access a web site to verify the authenticity of a haptic widget. The website may then transmit a signal to the widget 200 to request its digital signature or other authentication information. In response to such a request, the widget 200 provides the digital signature or authentication information, which is then processed by the website to verify its authenticity. Upon verification, the website may provide an indication to the user of the authenticity of the widget, or, if the widget is not verified, the lack of authenticity.

In addition to activation or deactivation functions, a haptic widget's interface 220 may provide functionality to change parameters, such as operational parameters, of the widget 200. For example, a haptic widget 200 according to one embodiment of the present invention includes a plurality of configuration functions to configure the haptic widget. Suitable functions include one or more "volume" controls to set maximum or minimum magnitudes or intensities for one or more of haptic effects available within the widget, time-based settings (e.g., haptic effects off at night, on during the day, or a timer after which the haptic widget is deactivated), or power settings (e.g., deactivate haptic effects if battery level is below 20%).

As discussed above, in some embodiments, haptic widgets may be able to output different haptic effects based on configuration parameters or other external parameters. For example, in one embodiment, a game application available on a cell phone or a smartphone may be associated with a haptic widget provided by the operating system. The widget may be configured to output different haptic effects based on the time of day. For example, if a user attempts to execute a game application between 9 am and 5 pm on a weekday, the haptic widget may automatically select and play, without input from the game application, a haptic effect that will elicit a negative hedonic response (such as displeasure) as a deterrent. Alternatively, if the user attempts to execute the game application at night or on a weekend, the haptic widget may automatically select and play, without input from the game application, a haptic effect that will elicit a positive hedonic response (such as pleasure) as an encouragement. In another embodiment, the operating system may determine whether the play the positive or negative haptic effect when the game is activated and command the widget to output the selected haptic effect.

As discussed previously, some embodiments of the present invention may include haptic widgets associated with a particular brand or company. Such haptic widgets may be coupled with other functionality to provide haptic sensations in a variety of settings. For example, in one embodiment, device 10 comprises a plurality of processors, at least one of which is configured to receive and process Global Positioning System (GPS) signals to determine, among other information, a location of the device. Based on the determined location, the device 10 may determine the proximity of a store associated with a particular brand or company, such as a cellular provider's store. The device 10 then identifies a haptic widget associated with the cellular provider and sends at least one signal to the haptic widget to cause a brand-specific haptic effect to be played. In addition, in some embodiments, the device may send a signal to cause the haptic widget to also display an image or sound associated with the brand substantially simultaneously with the playing of the haptic effect. In addition, in some embodiments, the device 10 may further display a message to the user, such as substantially simultaneously with the brand-specific haptic effect or image or sound, to indicate that a store nearby provides products or services provided by the cellular provider. In such an embodiment, a user may be provided timely advertisements associated with a particular brand or company based on the user's location as well as an indication of the location of a nearby store.

Haptic widgets 200 may be defined to embody types of haptic effects, such as vibrations, or to define a group of haptic effects to be associated with particular functionality. For example, in one embodiment, a company, such as ECI, may create one or more brand-specific haptic widgets, each comprising one or more brand-specific haptic effects, and provide such widgets with devices produced by ECI. In addition, brand-specific widgets may be provided by other companies to be incorporated into ECI's devices. For example, for one or more cellular devices made by ECI, a cellular carrier may provide one or more haptic widgets to be incorporated into the ECI cellular devices that are usable on the carrier's network. For example, when the ECI connects to the cellular carrier's network, the device may invoke the wireless carrier's brand specific haptic widget to play a brand-specific haptic effect to help reinforce the wireless carrier's brand with the user. Similarly, haptic widgets from other companies may be provided as well. Such widgets may be activated by applications installed on ECI's devices or by advertisements within content displayed in other applications. For example, a company's advertisement within a webpage may identify and invoke a haptic widget on the device that was provided by the company, which may provide brand identification to a user of the device and cause a user to search for and view the advertisement.

Figure 2C:
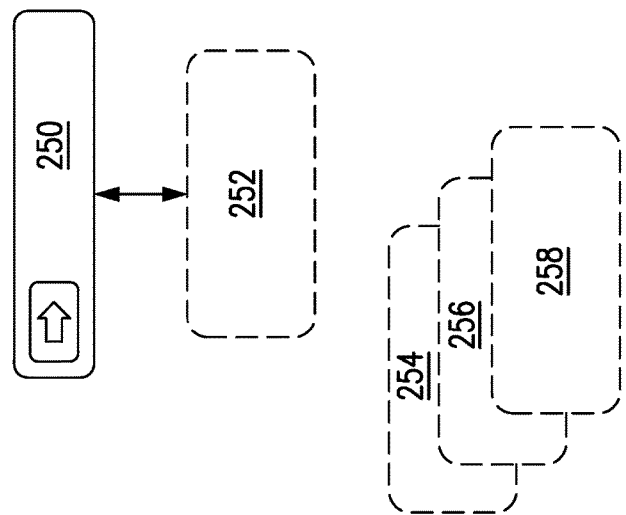
Figure 2B:
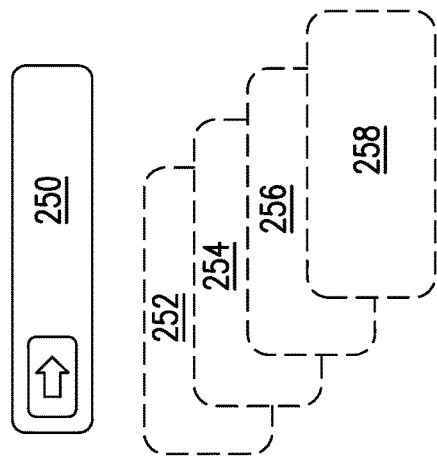
Figure 2D:
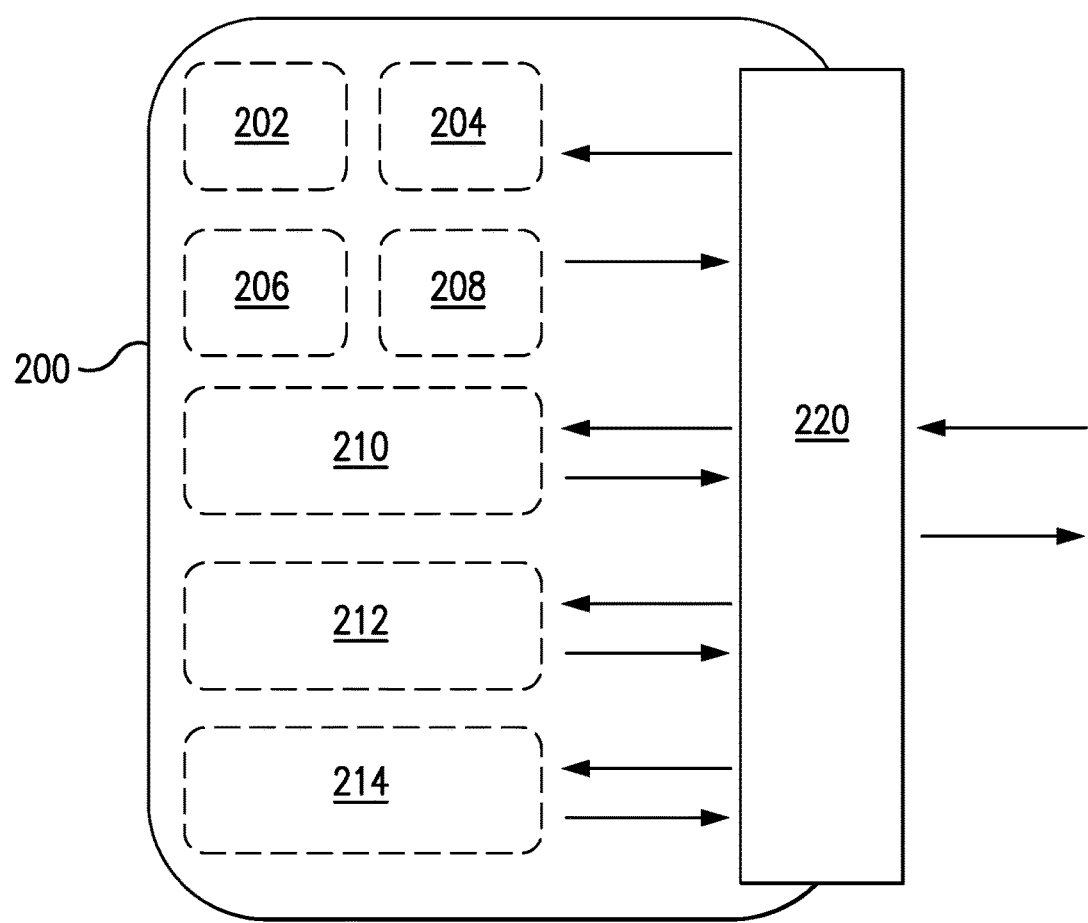

Referring now to FIGS. 2B and 2C, haptic widgets may be associated with other interface elements, such as applications, operating system functions, buttons, etc. FIG. 2B shows a system that includes a plurality of haptic widgets 222-228 and a user interface slider 220. To provide haptic effects for the slider 220, a haptic widget 222 may be associated with the slider 220 as shown in FIG. 2C. In the embodiment shown in FIG. 2C, the haptic slider 220 has been associated with a haptic widget 222. The slider 220 was configured to identify widgets available in the device and to select a suitable widget to use. For example, the slider may have been configured to be useable with a haptic widget that elicits a particular hedonic response and thus may be configured to identify available haptic widgets and to employ functionality available from widget 222 that provides hedonic haptic effects, which will be described in greater detail. In another embodiment, the slider 220 may be distributed with a haptic widget that is useable by the slider. In still another embodiment, the slider 220 may be configured to associate with haptic widgets that provide particular types of functions or that are widely available. After associating with a haptic widget 222, the slider 220 is configured to activate haptic effects within the haptic widget 222 based on manipulations of the slider 220.

Figure 12:
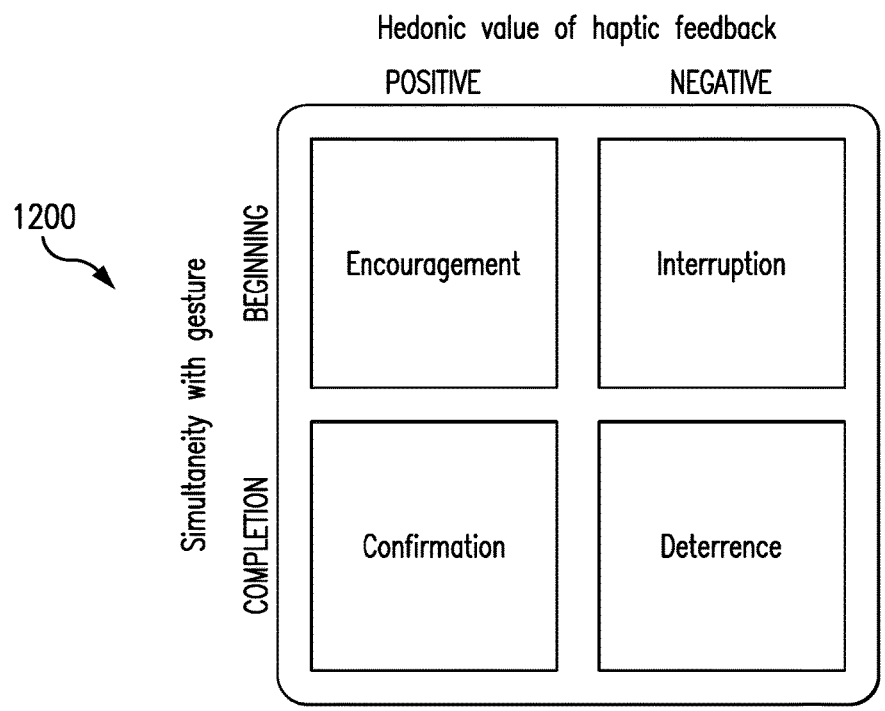
FIG. 12 shows a diagram of different types of haptic effects usable according to some embodiments of the present invention.

In some embodiments, haptic widgets according to the present invention may be configured to provide haptic effects with particular "hedonic value." As used herein, "hedonic value" refers to the degree of happiness or sadness felt by the decision-maker at the moment of an outcome's announcement. Haptic effects can be used by designers to encourage or require users to perform one or more of: making visual contact with parts of the interface that they would otherwise be able to bypass or ignore; requiring conscious action where users would otherwise take unconscious action; shifting the user's attention from one aspect of the interface to another; and/or giving the user time to cancel his decision to activate a widget halfway through the activation gesture. FIG. 12 shows a basic diagram 1200 of types of hedonic haptic effects.

As illustrated in FIG. 12, this can be achieved by presenting "positive" feedback at the beginning of a gesture which encourages the completion of the gesture, presenting "positive" feedback at the end of a gesture which promotes satisfying confirmation of the gesture and/or encouragement to repeat the gesture, presenting "negative" feedback at the beginning of a gesture which interrupts the user's attention on the gesture (possibly causing the user to shift attention to a visual item and/or possibly causing the user to abort the gesture), and presenting "negative" feedback at the end of a gesture which causes the user to associate the negative sensation with the gesture, and possibly deterring the user from using that gesture the next time the opportunity arises.

Figure 13:
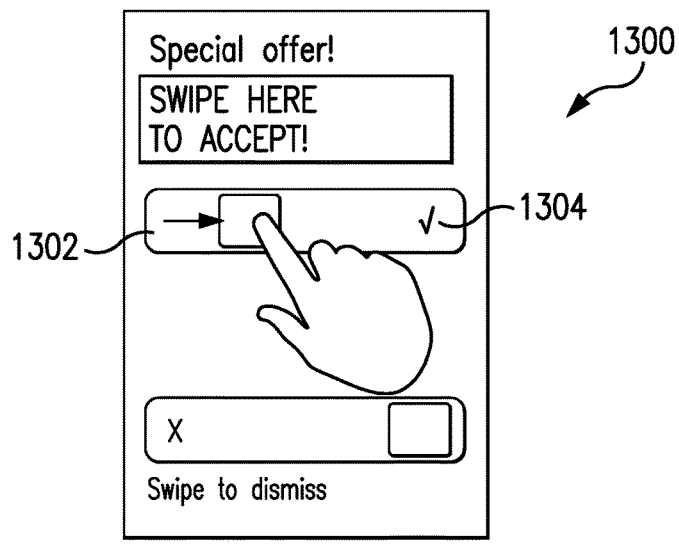
FIGS. 13-14 show systems for providing positive and negative haptic effects in an advertisement according to one embodiment of the present invention.
Figure 14:
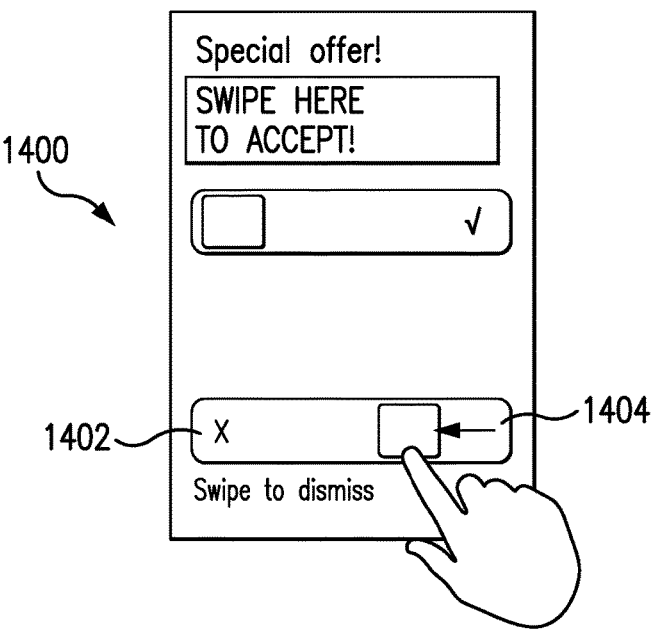

FIGS. 13-14 provide an example. Here, an interface 1300 features an advertisement 1302. The advertisement includes two interface elements, a slider 1304 which is dragged left-to-right to accept the offer and a slider 1306 dragged right-to-left to dismiss the offer. As shown in FIG. 13, haptic encouragement and/or confirmation can be used to associate positive feelings/experiences with use of the confirmation slider 1304 as shown at 1308. For example, the coefficient of friction may be lower when moving left-to-right, and a favorable effect (e.g., soft vibrate) may be played back when the check mark is reached. On the other hand, use of slider 1306 as shown at 1310 in FIG. 14 may be deterred/interrupted. For example, an interruption (e.g., clicks, pops, simulated rough texture, or a haptic effect otherwise designed to be alarming or distracting) can be provided as slider 1306 is moved right-to-left and/or an unfavorable effect can be played back when the "X" is reached (if the gesture is completed at all).

Figure 13A:
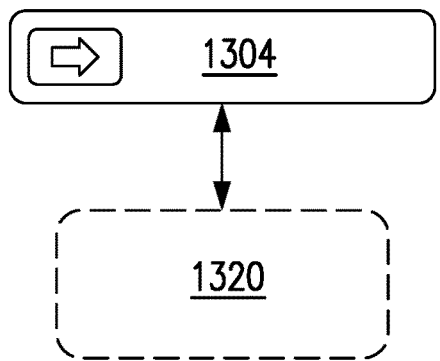
Figure 14A:
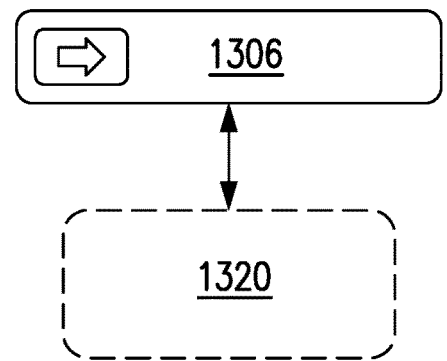

To provide haptic effects, each of these sliders 1304, 1306 is associated with a haptic widget 1320, as shown in FIGS. 13A and 14A. In the embodiments shown FIGS. 13A and 14A, each slider 1304, 1306 is associated with the same haptic widget 1320 as the haptic widget is configured to provide hedonic haptic effects associated with dragging gestures. Thus, each slider 1304, 1306 may provide the desired haptic effects simply by activating the appropriate haptic effect from the haptic widget. For example, slider 1304 may activate the positively-hedonic, "Action Encouragement" haptic effect to be output while the slider button is moving, followed by the positively-hedonic "Action Confirmation" haptic effect when the slider button reaches the end of its path. Similarly, slider 1306 activates the negatively-hedonic "Action Interruption" haptic effect while the slider button begins to move or is moving, and outputs a negatively-hedonic "Action Deterrent" when the slider reaches the end of its path to deter the user from feeling satisfied by the completion of the action, or from completing the action repeatedly, or from completing the action again in the future if the opportunity arises.

Figure 13B:
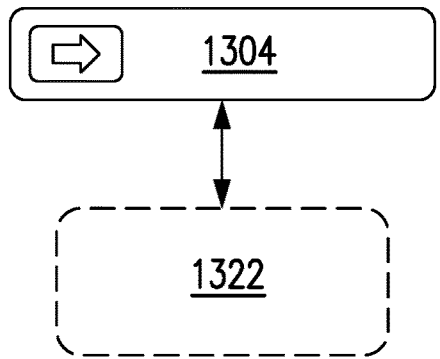
Figure 14B:
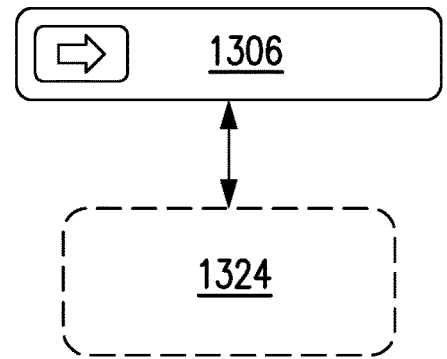

While in this embodiment, each of the sliders 1304, 1306 is associated with the same haptic widget, in the embodiments shown in FIGS. 13B and 14B, each slider 1304, 1306 is associated with a different widget 1322, 1323. For example, one widget 1322 may provide positive hedonic haptic effects, while the other widget 1324 provides negative hedonic haptic effects. Still other combinations of haptic effects could be grouped within a common haptic widget based on another organizational scheme. Further, each slider 1304, 1306 may be associated with a plurality of haptic widgets to provide a variety of different haptic effects to the respective slider 1304, 1306.

Different hedonic haptic effects may be generated to provide positive and negative haptic sensations. For example, in one embodiment, a positive hedonic effect may provide a reduced coefficient of friction, which allows a user to more easily complete a gesture. In another embodiment, a positive hedonic effect may comprise a low-magnitude, low-frequency vibration to provide a soothing or relaxing sensation for a user. Some embodiments of the present invention may combine multiple haptic effects to create a positive hedonic effect. For example, in one embodiment, a positive hedonic effect comprises a reduced coefficient of friction in combination with a low-magnitude, low-frequency vibration.

As discussed previously, negative hedonic effects are generated to provide an unpleasant haptic sensation to deter or interrupt a user's action. For example, in one embodiment, a negative hedonic effect may provide an increased coefficient of friction or provide a rough or unpleasant texture to deter a user's gesture. In another embodiment, a series of short-duration, high-magnitude "staccato" effects may be output and perceived as unpleasant by a user. As with the positive hedonic effects, some embodiments of the present invention may combine multiple haptic effects to create a negative hedonic effect. For example, in one embodiment, a negative hedonic effect comprises an increased coefficient of friction in combination with a series of short-duration, high-magnitude "staccato" effects to deter or interrupt a user's action.

In some embodiments, haptic effects may be used to discourage user action by providing pseudo-force feedback to increase a level of effort or concentration by the user to complete the action. For example, in one embodiment, a haptic effect may increase a coefficient of friction of the touch-sensitive input device, thereby providing actual resistance to the user action. In some embodiment, the haptic effect may be configured to provide confusing or counter-intuitive tactile sensations. For example, in one embodiment, a haptic effect may be configured to indicate a movement of an on-screen object in a direction different than the direction of a user's movement. In such an embodiment, if a user attempts to move an advertisement by sliding it off of the screen to the right, a vibration may be output that emulates a movement in an "up" direction, rather than a "right" direction, or the haptic effect may emulate a collision (and the image may appear to stop moving following the "collision"), thus potentially requiring the user to lift a finger and re-engage the image by touching it again.

Figure 15:
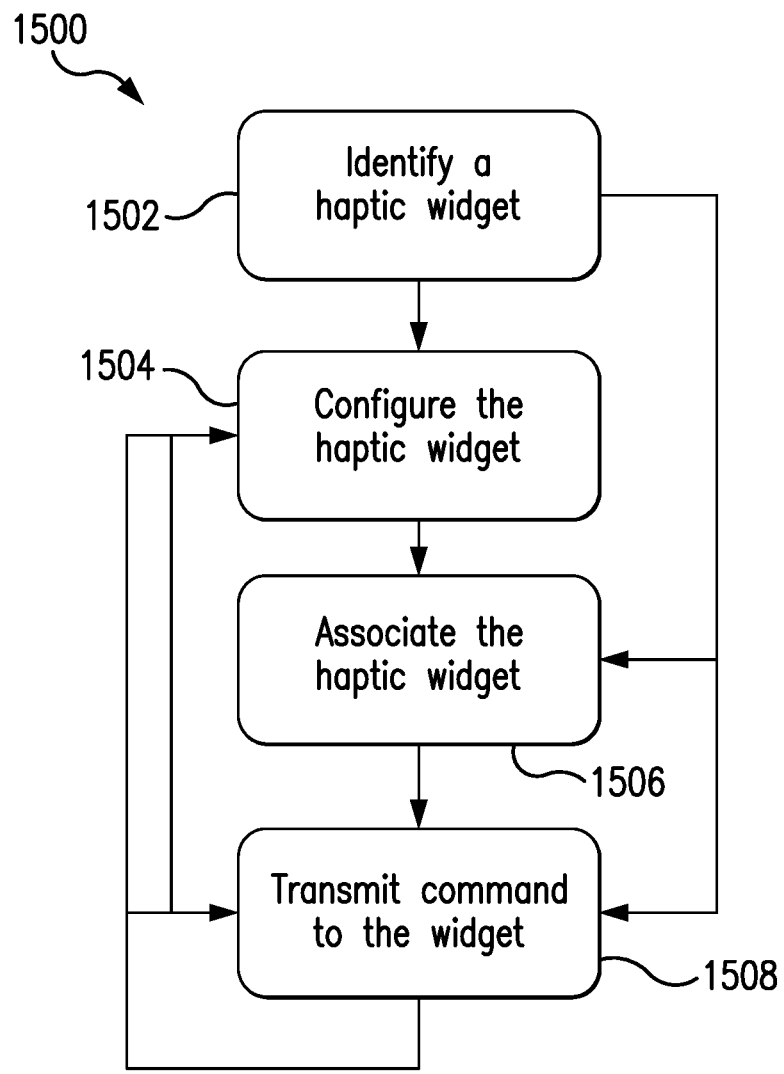
FIGS. 15-17 show methods for providing haptic effects according to some embodiments of the present invention.

Referring now to FIG. 15, FIG. 15 shows a method 1500 for providing haptic effects according to one embodiment of the present invention. The following description of some embodiments of the present invention will be made with reference to the device shown in FIG. 1A; however, other devices, such as those shown in FIGS. 1B-C are suitable for use with these and other embodiments of the present invention.

In the embodiment shown in FIG. 15, the method 1500 begins at block 1502 with the step of identifying a haptic widget. As described previously, a haptic widget may be capable of storing and providing identifying information. In some embodiments, a haptic widget may store a name, a brand, a company name, an ID number, a digital signature, or other identifying information. To identify a haptic widget, a signal may be sent to the haptic widget requesting its identification information. In one embodiment, a haptic widget may receive a signal requesting identification information. In response, the haptic widget provides one or more pieces of information associated with the haptic widget's identity. After receiving the identification information, the device 10 may determine the identity of the haptic widget or identifying characteristics of the widget. Alternatively, the haptic widget may not respond to the signal, as the source may be unknown or unverified, or may not have identification information to provide.

In some embodiments, a haptic widget may be identify by determining an association between an application, an operating system, an image, or other object or program code and a haptic widget. For example, in one embodiment, the device 10 maintains a database describing associations between haptic widgets and applications or other objects. In such an embodiment, the device 10 may provide a haptic widget or may provide a reference to a haptic widget based on information stored in the database. In a further embodiment, an application or other program code may identify a haptic widget to be invoked, such as by sending a message to a specific haptic widget or by invoking an interface function of the haptic widget. After a haptic widget has been identified, the method 1500 proceeds to block 1504 if configuration is needed, otherwise the method may skip block 1504 and proceed to block 1506.

In block 1504, the haptic widget is configured. In one embodiment of the present invention, a haptic widget may be configured by activating the haptic widget or by registering it. For example, a haptic widget may be registered with an operating system by executing an installation routine that stores the haptic widget on a non-volatile computer-readable medium, activates or authenticates the widget, and provides information about the widget to the operating system, such as a location and information about the widget's interface, such as haptic functionality or branding information. In one embodiment, a haptic widget may be configured by changing a parameter of the widget, such as the widget's "volume," or the relative magnitude of haptic effects within the haptic widget. Note that while in some embodiments, it may be necessary to configure a widget each time prior to using it, or to send parameters to it with one or more commands, in some embodiments, the configuration step 1504 of the method 1500 shown in FIG. 15 need not be executed each time the method 1500 is performed and instead may be optionally performed. After configuring the widget, the method 1500 proceeds to block 1506 if the widget is to be associated with an application, icon, or other software or hardware component of the device 10. If no association step is needed, the method proceeds to block 1508. For example, a user may simply interact with the widget itself rather than interacting with it indirectly by, for example, touching an image of a brand or logo.

At block 1506, the haptic widget is associated with a software or hardware component of the device. For example, in one embodiment, a user may install a software application and a haptic widget on their smartphone. During the installation procedure, the operating system may associate the application with the widget such that when the application is executed, the operating system transmits a signal to the haptic widget. In one embodiment, a webpage may include an image of a brand or an advertisement. When the webpage is parsed and displayed, program code within the web page request information regarding haptic widgets that are installed on the device 10. If the program code determines that one or more widgets is usable, the program code stores information regarding the widgets to be used while the webpage is visible and associates the widgets with the image or the advertisement. In one embodiment, the program code stores the information such that the association step is only performed the first time the user navigates to the web page, such as in a cookie. However, in another embodiment, the web page may re-associate haptic widgets each time the user navigates to the webpage. In a further embodiment, a user may manually associate a haptic widget with a software or hardware component of the device 10. For example, the user may associate a haptic widget with a calendar application such that calendar reminders cause the haptic widget to play a haptic effect or associate the microphone with a haptic widget such that a haptic effect is played each time the microphone is activated, e.g. which may inform the user if she inadvertently placed a phone call.

Alternatively, the user may associate both the haptic widget and individual haptic effects within the widget with a software component. For example, a user may associate a calendar appointment with a haptic widget, but may associate different haptic effects within the widget with different reminders. For example, the user may associate a low-intensity haptic effect with a reminder 30 minutes prior to the appointment and a strong, negative hedonic haptic effect with a reminder occurring at the time of the appointment or at a time after the appointment to notify the user that she is late to the appointment, or if the user has skipped an appointment a certain number of times (e.g. has skipped a gym or training appointment more than three times). After the haptic widget has been associated with a software or hardware component, the method proceeds to block 1508.

At block 1508, a command is transmitted to the haptic widget via the widget's interface. For example, a "play" command may be sent to the haptic widget via the interface. Such a command may comprise one or more parameters, such as magnitude, duration, etc., or may simply select a particular haptic effect, wherein the widget determines parameters for the haptic effect based on the widget's configuration parameters. In some embodiments, a play command may identify a plurality of haptic effects to be output, or even haptic effects, images, videos, sounds, or other effects within the haptic widget to be output.

Further, other commands may be sent to the haptic widget in some embodiments. For example, in some embodiments, a command may be sent to activate part or all of the functionality of a widget, or deactivate part or all of the functionality of the widget. In one embodiment, the command may request information or provide a configuration setting. In addition, a plurality of commands may be sent to the haptic widget in series or substantially simultaneously according to some embodiments. In response to receiving the command, the haptic widget performs functionality associated with the command, such as generating and providing a signal configured to cause a haptic effect. After the command has been transmitted to the widget, the method 1500 may terminate, or it may return to step 1508 where another command is transmitted to the haptic widget or it may return to block 1504 where the widget may be reconfigured. In some embodiments, additional functions may be performed or the steps of the method 1500 may be performed in different orders.

Haptic Branding

As previously discussed, embodiments of the present invention may provide haptic effects associated with brands or logos. For example, embodiments have been disclosed herein for providing such haptic effects through the use of widgets. However, haptically-enabled branding may be implemented and used in a variety of ways.

As is generally known, an entity, such as a company, may develop images or logos that uniquely identify the company or products associated with the entity. Such images or logos may be formally trademarked or may simply be conventionally associated with a particular company or product. However, other source identifying characteristics may be used to reference a particular product or company. For example, haptic perception of products and their packaging is an important part of quality perception and differentiation. Both of these are sorely missed by online marketing campaigns. Furthermore, for brand development, "touchpoints" are the stages of the relationship between a customer and a brand. Touchpoints are the critical points where opinions and feelings about brands are formed. One of the classic touchpoints for a brand is product packaging. For products being marketed with digital and social media, there is no package to be touched. Haptics can fill this sensory void and make brands tangible and visceral. Embodiments below relate to the "haptic component of brand"—digitally generated tactile and force feedback that is part of a marketing message, which may influence consumer behavior.

Figure 3A:
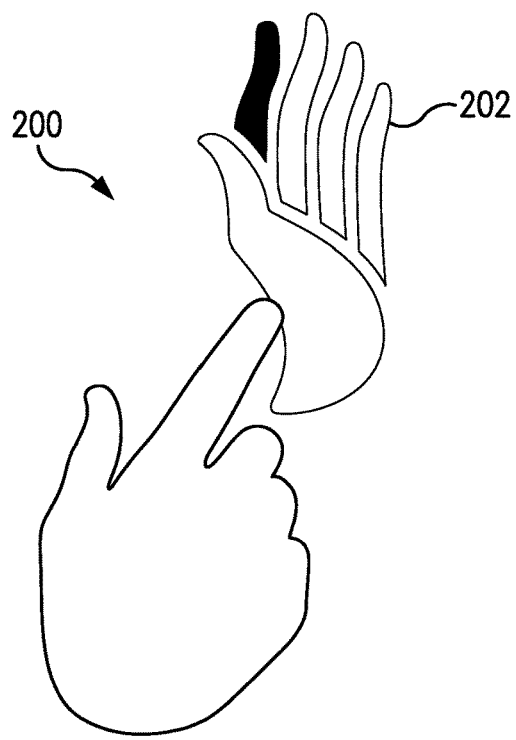

In one embodiment, haptic effects are used to provide an interactive avatar for a company logo that gets users' attention with animated motion, haptics, and/or the possibility of interactive gesture. The logo for Immersion Corporation, the assignee of the present application, indicated at 200 in FIG. 3A is an example of an avatar that gains attention and sympathy by moving in human-like ways. Embodiments can add haptic feedback and response to gestures so that, when the avatar moves or waves or "taps" the screen, a user can feel vibrations caused by its movements or tapping gestures. For example, a runtime package, application, or instruction set can be provided so that as the avatar is animated, a vibrotactile effect is output. Additionally, when a user touches the avatar, it may simulate a high-five gesture with a corresponding haptic effect. Via one or more haptic effects, the user can interact with the logo and the various interactions with the brand and the richness of the haptic experience may draw the user in, thus strengthening his or her emotional response to the brand.

Figure 3B:
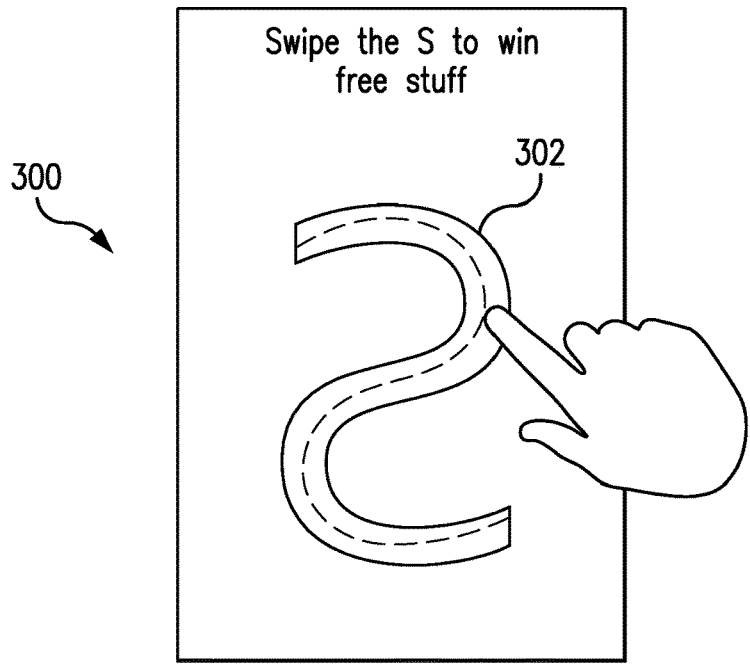
Figure 3C:
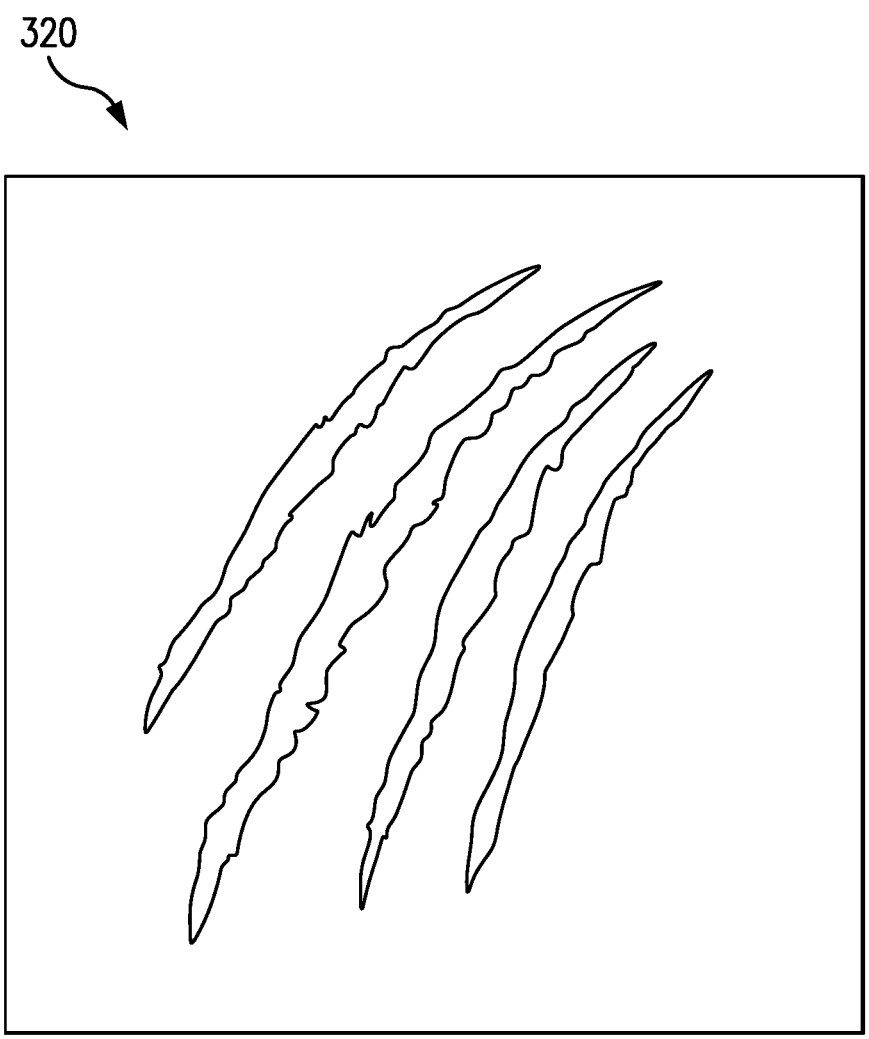

In one embodiment, haptic effects are used to provide an interactive icon for company logo that encourages customers to "enact" a brand. Persuading a target to write the name of a product, or otherwise "sculpting" consumer behavior towards the brand can increase brand loyalty and encourages brand advocacy. Accordingly, haptic effects can be used to facilitate such behavior—as an example, completion of the gesture can be rewarded with a pleasurable haptic response. For example, logo 300 of FIG. 3B can be rendered onscreen. Touch or other input can be detected to provide a haptic response when the logo is traced with the finger. Additionally or alternatively, haptic feedback can be provided while the input is in progress. Similarly, FIG. 3C provides a logo 320 comprising a plurality of apparent claw marks. According to one embodiment of the present invention, a user may employ a multi-touch gesture to interact with the logo to simulate a clawing motion. While the user is performing the gesture, the device 10 may output a haptic effect associated with the gesture, such as haptic effects configured to simulate a tearing feeling, such as claws tearing through cloth.

In one embodiment, haptic effects are used to provide a haptic component of product identity and/or characteristics. For example, consider the document 400 shown in FIG. 4, depicting a list of products 402, 404, 406, 408, 410, and 412. For instance, document 400 may comprise a web page with listings of different digital cameras. Displayed within a web page, each of the cameras appears very similar and properties like weight and texture, which are often associated with perception of quality, are not available to the consumer. The embodiment shown in FIG. 4 addresses this problem by allowing product marketers to associate a haptic effect with their product. For example, as shown at 414, the effect could occur when the user slides his finger over the product's image. As another example, an effect may be used to differentiating products with a unique and pleasant haptic "click" or other brand-specific haptic effect that is output when the user touches the link to a particular product in a list of search results (for example, a click of a particular camera's shutter).

Embodiments of the present invention may provide haptic branding through the use of haptic widgets. For example, as discussed previously, a haptic widget may be a brand-specific haptic widget, or may include brand-specific haptic effects or images, such as logos or brands. In one embodiment, a device 10 may include a brand-specific haptic widget associated with ECI. In such an embodiment, the device 10, at startup, may transmit signals to the haptic widget to cause it to display an image associated with ECI as well as output a brand-specific haptic effect associated with ECI. In some embodiments, the device 10 may be configured to display the image and output the brand-specific haptic effect at substantially the same time.

Similarly, applications, operating systems, or content may be configured to use brand-specific haptic widgets to provide a richer user experience associated with the brand. In one embodiment, a webpage may include an image associated with a brand or company. In such an embodiment, the webpage may include program code configured to request information regarding haptic widgets available on a computer system. The computer system may maintain a table describing installed or activated widgets or may query one or more of the installed widgets to determine identities of each. In such an embodiment, the computer system provides information regarding the available haptic widgets in response to the request. The program code may then identify a haptic widget, such as a brand-specific haptic widget, capable of providing a haptic effect associated with the image. The program code then invokes the haptic widget to provide a selected haptic effect. Such embodiments provide a more immersive, informative browsing experience for a user that makes use of haptic widgets previously installed on the user's computer or device.

In one embodiment, a web page or other content provided by a remote device, such as a server, may include a haptic widget. For example, a user may navigate to a web page that includes a haptic widget, which is transmitted to the user's device and used by the web page. In one such embodiment, the web page may install the haptic widget, either after receiving a confirmation by the user or automatically without user intervention, and may then configure or activate the haptic widget to output haptic effects to the user, such as based on content within the web page.

In another embodiment, a user may install an application on a computer or device, such as a smartphone. During or after installation, a haptic widget may be associated with the application. For example, in one embodiment, during installation, an operating system may determine a provider of the application and identify one or more haptic widgets associated with the provider of the application, such as one or more brand-specific haptic widgets, or haptic widgets comprising brand-specific haptic effects or images associated with the application provider. In one embodiment, the application, upon execution, may detect haptic widgets available on the computer or device and associate one or more widgets with the application such that during application startup or execution, one or more brand-specific haptic effects may be played.

Figure 16:
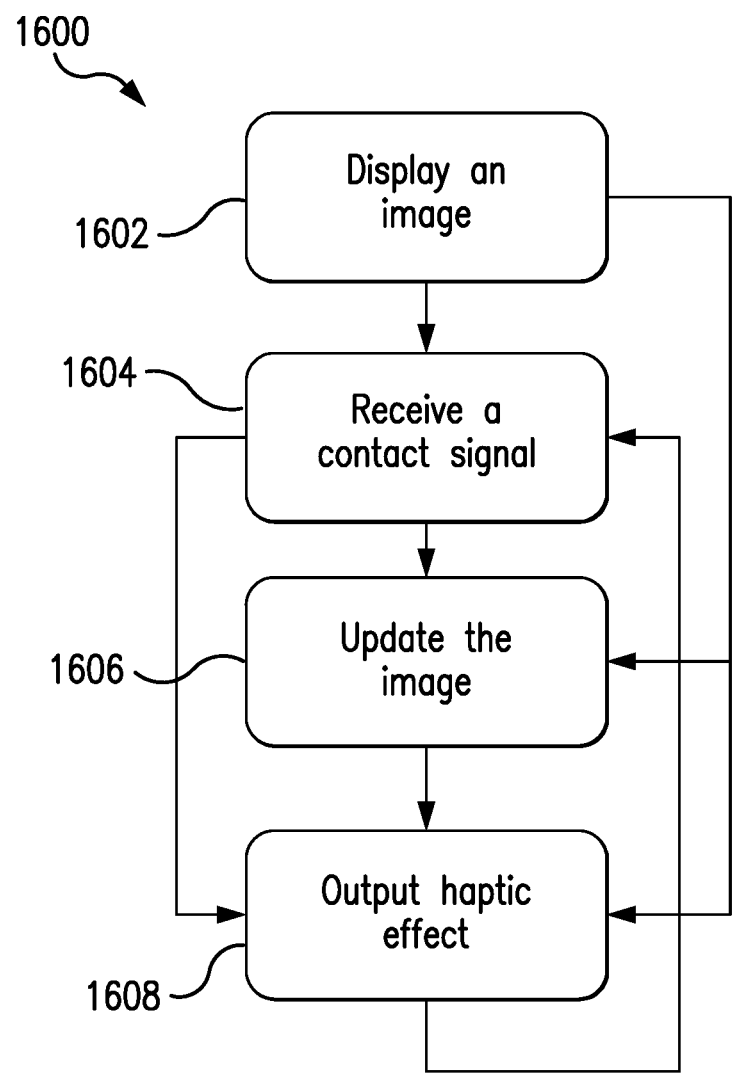

Referring now to FIG. 16, FIG. 16 shows a method 1600 according to one embodiment of the present invention. The description of FIG. 16 will be made with reference to the device 10 shown in FIG. 1A; however, other devices, such as those shown in FIGS. 1B-C are suitable for use with these and other embodiments of the present invention.

In the embodiment shown in FIG. 16, the method 1600 begins at block 1602 with the step of displaying an image associated with a brand. As is known, companies may generate images associated with brands, such as logos, mascots, etc. In one embodiment, an image may be displayed as a part of a splash screen when the device 10 is booting or when an application is launching. In one embodiment, an image may be displayed within web content or within a set of sponsored links on a search result. In some embodiments, an image may be displayed within a game distributed without cost, but with in-game advertising, such as via banner or interstitial ads. After the image is displayed, the method 1600 proceeds to block 1604. However, in some embodiments, the method may proceed to block 1606 or

1608 following block 1602. For example, in some embodiments, the image may comprise an animation and thus the method may proceed to block 1606. In some embodiments, the image and a haptic effect may be output substantially simultaneously, in which case the method 1600 may proceed directly to block 1608, or perform blocks 1602 and 1608 substantially simultaneously.

At block 1604, the device's processor receives a signal indicating a contact with a touch-sensitive input device. For example, in one embodiment, the device may comprise a touch-sensitive input device configured to sense a contact, such as from a user's finger. In such an embodiment, as described above with respect to FIGS. 1A-C, the touch-sensitive input device may provide position information associated with contact as well as other information, such as pressure information. After receiving the contact signal, in one embodiment, the method 1600 proceeds to block 1606; however in some embodiments, the method may proceed to step 1608.

In block 1606, the device's processor updates the displayed image. For example, in one embodiment, the displayed images may cycle through a plurality of images to provide an animation. In another embodiment, the displayed image may be modified or an animation may be triggered by the received contact signal, such as a user's contact or gesture associated with the image. In one embodiment, a user may touch the image or perform a gesture on the image, which may cause the image to change color, shape, etc. or to perform an animated movement, such as walking or jumping. However, in some embodiments, the image may not change and thus, block 1606 may not be reached. However, after block 1606 has completed, the method 1600 proceeds to block 1608.

At block 1608, the device 10 outputs a haptic effect. For example, in one embodiment, the device 10 may output a brand-specific haptic effect associated with the image. In another embodiment, the device 10 may output a plurality of brand-specific haptic effects during an animation of the image, such as an animation of a corporate logo or mascot. In further embodiments, the device 10 may output brand-specific haptic effects associated with the user's contact or gesture. For example, if a user touches the image, the device 10 may output a positive hedonic haptic effect, or if the user correctly traces the image, such as an image showing a corporate logo, the device 10 may output a positive hedonic haptic effect throughout the gesture and output a second positive hedonic haptic effect when the user successfully completes the gesture, or a negative hedonic haptic effect if the user incorrectly performs the gesture, or halts the gesture prior to completion. Further, in some embodiments, the haptic effect may be output by way of a haptic widget. For example, a haptic widget may be associated with the image or with a brand associated with the image. In one such embodiment, when the user interacts with the image, the haptic widget may be commanded to output one or more signals to cause brand-specific haptic effects.

In some embodiments of the method 1600, one or more steps may be performed substantially simultaneously, asynchronously, or in different orders. For example, an animated image may be displayed irrespective of any user contact with the animation, and haptic effects may be output at any time during the animation if the appropriate contact is made or gesture is performed. Further, in some embodiments, fewer than all of the depicted steps may be performed. For example, in one embodiment, the image may be displayed substantially simultaneously with a brand-specific haptic effect while the device 10 is booting, but the device 10 may not recognize user contacts with the screen and may not update or change the image.

Haptic Advertising

As previously discussed, embodiments of the present invention may provide haptically-enabled advertising. For example, embodiments include using haptics to help companies reach their customers through haptically enhanced advertisements consisting of haptic superstitials, haptic-video synchronous ads, or interactive haptic banner ads. Haptics can provide some unique benefits to this space as it is inherently emotional, is peripherally processed and is highly attention-grabbing. Advantages can include (but are not limited to) providing a new tool for marketers to increase their ad effectiveness, improving the user experience of mobile ads (user-focused), making mobile ads more effective (advertiser-focused), and/or facilitating product differentiation. For example, an ad delivery entity or network may differentiate itself by presenting ads with haptic feedback. Several examples are noted below—any or all could be implemented, for example, by using a browser or other application enabled to provide haptic feedback in response to accessing data identifying an advertisement or other communication specifying haptic effects. The browser may be executed by a mobile device or another computing device.

In one embodiment, haptic effects are provided in conjunction with interstitials. An interstitial (something "in between") is a segment within a document (such as an image or block of text) that is inserted in the normal flow of editorial content structure on a Web site or other document for the purpose of advertising or promotion. It can be highly intrusive, somewhat intrusive, or not intrusive at all, and the reaction of viewers usually depends on how welcome or entertaining the message is.

Figure 5:
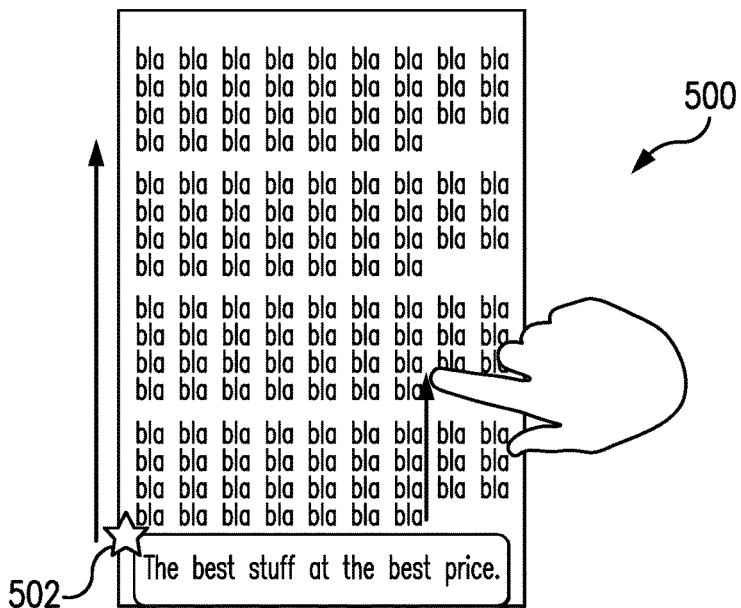
FIG. 5 shows a system for providing haptic effects based on an interstitial advertisement according to one embodiment of the present invention.

One example of the use of haptics is shown in FIG. 5. A web page or other document 500 includes content 502. The browser or other displaying application is configured to play back a haptic effect (alert, change in texture, etc.) when the interstitial 504 appears on the screen and when it disappears off the screen in an attempt to shift the focus of the user to the advertisement. This may be particularly effective in gesture-based interfaces where the user is already interacting with the screen in order to control the scroll-position of the document within the document browser.

Additionally, a haptic effect deemed "pseudo-force feedback" could be used to cause the sliding-scrolling gesture 506 to require more distance to get the advertisement to scroll off-screen (e.g., the distance shown at 508), thus requiring more conscious and physical effort on the part of the user to dismiss the ad, keeping the eyes on the ad a longer time. This pseudo-force feedback could be made extremely subtle, so that the user is not aware that the scrolling behavior is affected by the ad's position.

Figure 6:
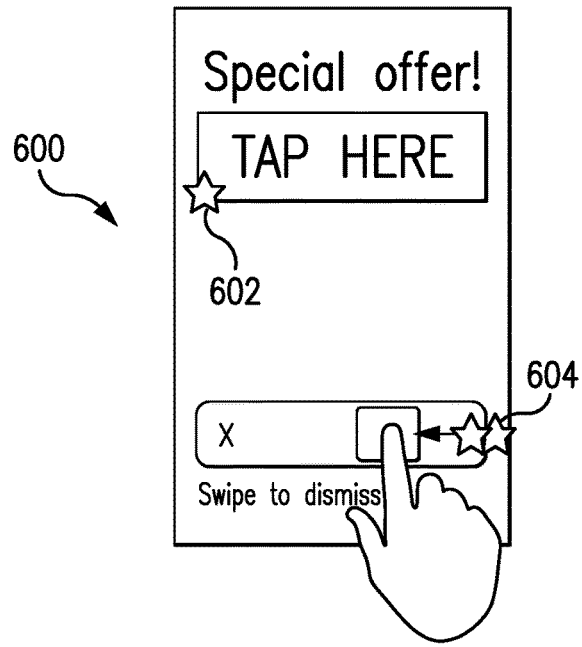
FIGS. 6-9 show systems for providing positive and negative haptic effects according to one embodiment of the present invention.

In one embodiment, a superstitial ad is used along with haptic feedback. Superstitial ads visually occlude the main part of the document, and play only upon a user-initiated break in surfing, such as a mouse click, screen tap, etc. Superstitials can be used to achieve multiple advertising goals, including branding, direct marketing, commerce and entertainment. As shown in FIG. 6, a haptic effect (alert, change in texture etc.) can be sent when the superstitial 602 appears on the screen 600 and when it disappears off the screen. In this example, the superstitial features a close button 604 activated by a left-to-right gesture. Additionally a haptic deterrent 606 or reward 608 could be used to deter the user from dismissing the ad or encourage the user to interact with the advertisement, respectively. For example, the haptic deterrent may be an unpleasant or sharp haptic effect, may comprise resistance in the close button 604, etc.

Embodiments may also utilize haptic effects to support ad-specific interaction(s). Here the purpose of haptics is to additionally engage the user through haptic effects while they are interacting with the advertisement. This will provide a more immersive and pleasant user experience with the advertisement. Casual games (sports game, puzzle game) can use haptic feedback to become engaging and immersive (tap of the bat, drag the avatar through the mud etc., comparing two textures). Haptic effects can be used to attract the user to the game initially with haptic break-in (commanding the user's attention) and/or to reward their play with immersive haptic effects.

Figure 7:
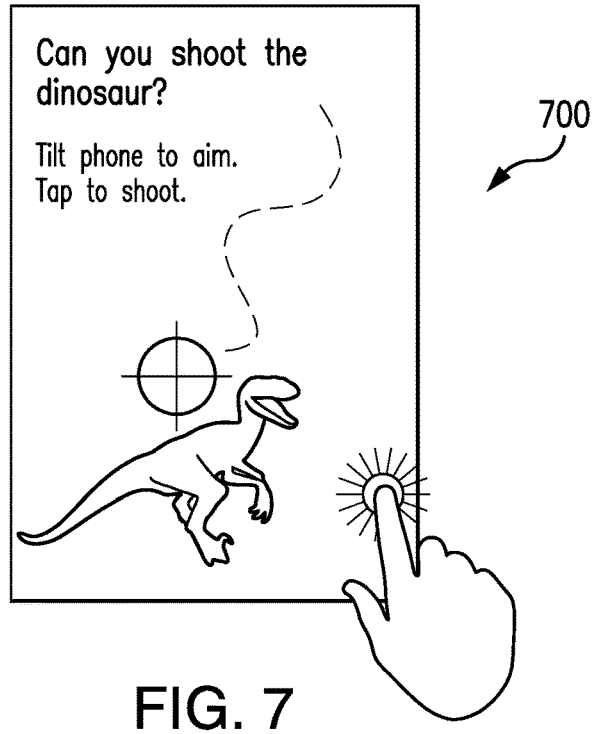
Figure 8:
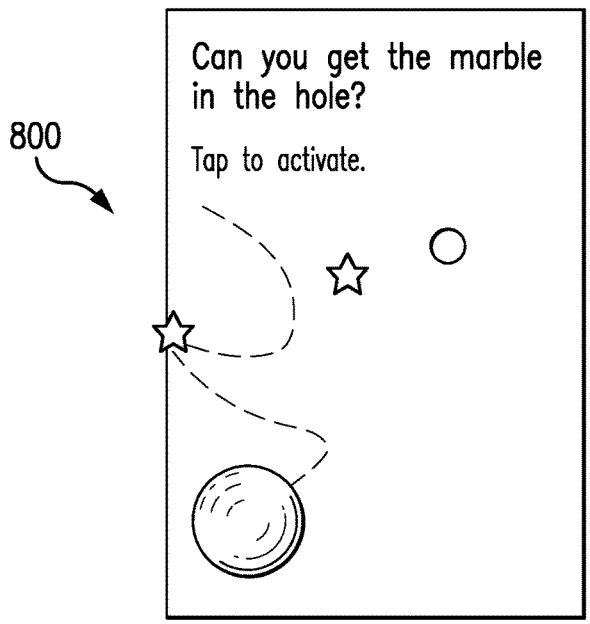
Figure 9:

For example, FIG. 7 depicts a shooting game 700 in which a sight 702 is aimed by tilting a phone or other device, with the objective being to target dinosaur 704 and tap to shoot. As shown at 706, a haptic effect can be provided when the tap occurs. Additionally, haptic effects can be provided when the game begins, when the dinosaur is targeted, etc. FIG. 8 shows a game 800 in which the objective is to tilt the device to move marble 802 to hole 804. Haptic effects can be provided, e.g., when the game begins, when the border is struck at 806, when the hole is approached at 808, and otherwise during the game. FIG. 9 shows a simulated scratch-off game 900. A touch input as shown at 902 is used to scratch off a virtual lottery ticket. Haptic effects (e.g., texture changes from scratchy to smooth) can be used as the covering in the virtual lottery ticket is scratched away.

Haptics can be used to encourage the user to interact with the advertisement using gestures or familiar day-to-day hand interaction. Further examples of interactive widgets for casual games embedded in ads are light switches, sliders, lottery scratch cards, and spinning wheels. Another possibility is to encourage the user to search for hidden haptic "easter eggs" by exploring an ad with their finger or through tilting the phone.

Embodiments also include synchronizing or otherwise coordinating haptic effects with video (and/or audio) content in ads. Today, many ads are made to be attention-grabbing by leveraging animation/video, and audio to create pseudo-social interaction scenarios. For example, an ad may feature a video of a person who walks on camera, looks directly at the camera (at the user), and begins talking about a product. This is engaging because we are hardwired to pay attention to people who are looking at us and talking to us. Additionally, moving objects (especially people) cause us to instinctively track them with our eyes. Furthermore, if person is attractive, this eye-tracking effect is significantly heightened.

Figure 10:
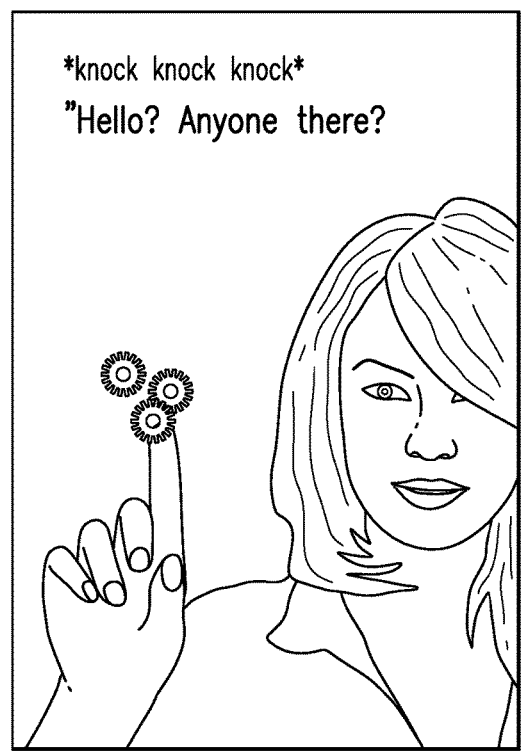
FIGS. 10-11 shows a system for providing haptic effects in an advertisement according to one embodiment of the present invention.

Haptics can be used to further improve the efficacy of this scenario. For example, as shown in FIG. 10, a video 1000 may feature a person 1002 who taps or knocks on the screen while text 1004 (and/or speech) output is provided. For example, person 1002 in the advertisement may tap the screen using finger 1006. Haptic effects 1008 (e.g., vibrations, localized pops or clicks) can be synchronized with each tap so that the user "feels" person 1002 knocking, drawing the user's attention to the ad and initiating visual contact. This synchronization of multi-modal feedback also creates an immersive pseudo-social scenario, where the user feels that the person in the ad is more present, and therefore more real, which may improve the user's confidence in the testimonial or other ad content, or the intensity of the user's interest in the ad. In addition to or instead of providing haptic effects 1008, haptic effects could be keyed to the audio portion (if any) of the advertisement—for example, different haptic effects could be associated with particular words or intonations in the audio. For example, the audio track can be analyzed and converted to haptic data used to provide different effects as the audio is output via a device speaker and/or displayed as onscreen text.

Although shown in the context of an advertisement, such effects could be used in other contexts—for example, a "video mail" message could record video of a first person along with the first person's haptic interactions (e.g., taps, etc.) with a screen area. When played back by a second person (e.g., using a mobile device), the video could be played back along with the recorded interactions. Similarly, haptic effects could be keyed to audio as noted above during a haptically-enabled audio message. Of course, the haptic effects/interactions could be relayed from one device to another during a real-time communications session (e.g., video chat/teleconference, voice call, etc.) as well.

Figure 11:
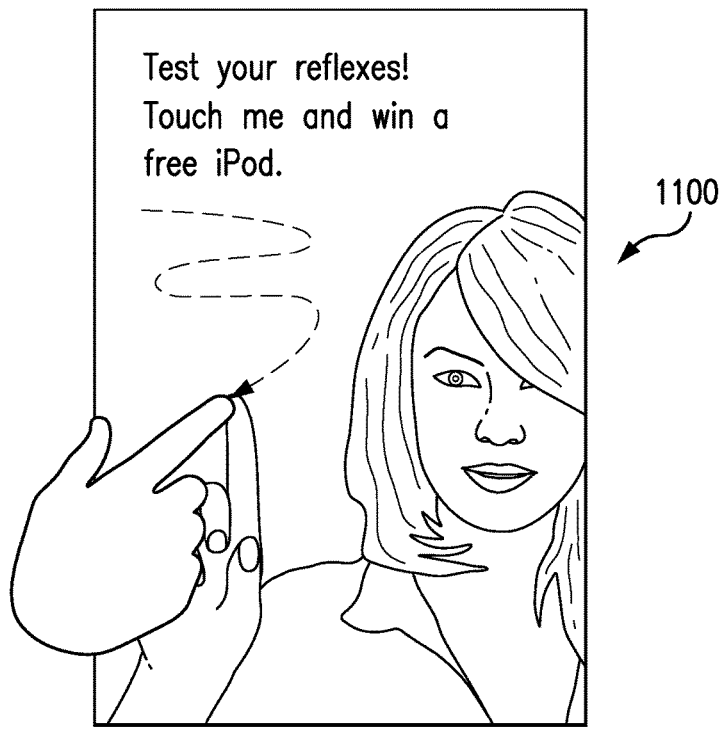

The sensory immersion in this interaction can be further heightened by inviting the user to interact with the video gesturally. For example, as shown in FIG. 11, the person 1102 in video 1100 could slide her finger 1106 along the screen and ask (as shown at 1104) the user to try to track her finger 1106 as it moves along path 1108. When the user does so successfully, a haptic reward is delivered. The illusion of haptically communicating with the person in the video would promote emotional response and attentional investment in the interaction, keeping the user engaged for a longer period of time and/or generating feelings of well-being and social acceptance.

Additional examples of video-synchronized haptic ads include using effects with other objects, such as a vibration or pop when a flying object such as a pie hits the screen. These and other events can win the user's attention by simulating kinetic motion and collision.

Figure 17:
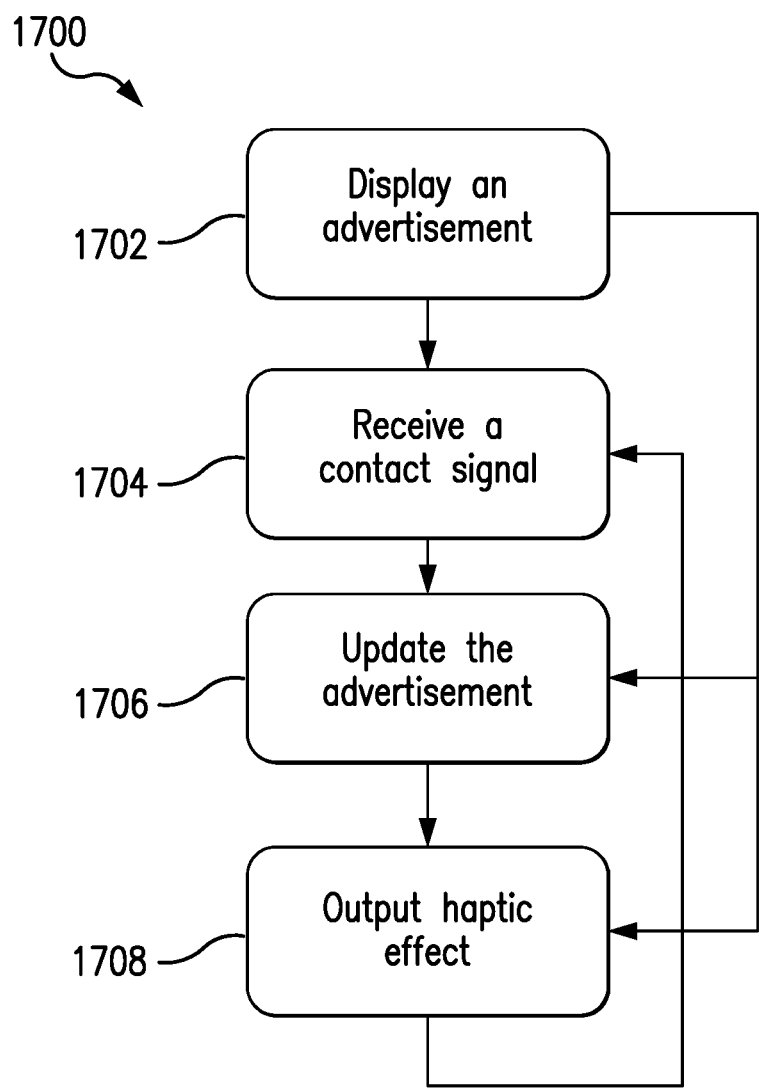

Referring now to FIG. 17, FIG. 17 shows a method 1700 according to one embodiment of the present invention. The description of FIG. 17 will be made with reference to the device 10 shown in FIG. 1A; however, other devices, such as those shown in FIGS. 1B-C are suitable for use with these and other embodiments of the present invention.

In the embodiment shown in FIG. 17, the method 1700 begins at block 1602 with the step of displaying an advertisement. As is known, companies may provide advertisements to be embedded within content, such as webpages, videos, games, etc. In one embodiment, an advertisement may be displayed within a webpage being viewed by a user, such as within a set of sponsored links on a search result. In some embodiments, an advertisement may be displayed within a game distributed without cost, such as via banner or interstitial ads. In some embodiments, the advertisement may include animations or mini-games for a user to play. After the advertisement is displayed, the method 1700 proceeds to block 1704. However, in some embodiments, the method may proceed to block 1706 or 1708 following block 1702. For example, in some embodiments, the advertisement may comprise an animation or a mini-game for a user to play and thus the method may proceed to block 1706 as the advertisement's animation executes. In some embodiments, the advertisement and a haptic effect may be output substantially simultaneously, in which case the method 1700 may proceed directly to block 1708, or perform blocks 1702 and 1708 substantially simultaneously.

At block 1604, the device's processor receives a signal indicating a contact with a touch-sensitive input device. For example, in one embodiment, the device may comprise a touch-sensitive input device configured to sense a contact, such as from a user's finger. In such an embodiment, as described above with respect to FIGS. 1A-C, the touch-sensitive input device may provide position information associated with contact as well as other information, such as pressure information. After receiving the contact signal, in one embodiment, the method 1600 proceeds to block 1606; however in some embodiments, the method may proceed to step 1608.

In block 1606, the device's processor updates the advertisement. For example, in one embodiment, the advertisement may cycle through a plurality of images to provide an animation or to provide mini-game for a user to play, such as a miniature golf game. In another embodiment, the advertisement may be modified or an animation may be triggered by the received contact signal, such as a user's contact or gesture associated with the image. In one embodiment, a user may touch the advertisement or perform a gesture on the advertisement, which may cause the advertisement to initiate a game or to hide or close the advertisement. However, in some embodiments, the advertisement may not change and thus, block 1606 may not be reached. However, after block 1606 has completed, the method 1600 proceeds to block 1608.

At block 1608, the device 10 outputs a haptic effect. For example, in one embodiment, the device 10 may output a haptic effect associated with the advertisement, such as a haptic effect associated with an apparent interaction within the advertisement, such as a ball rolling on a surface or a gun being fired. In another embodiment, the device 10 may output a plurality of haptic effects during an animation of the image, such as an animation of a corporate logo or mascot in which the mascot walks or hops around on the screen, or a person appears to tap on the screen. In further embodiments, the device 10 may output brand-specific haptic effects associated with the advertisement or with the user's contact or gesture. For example, if a user touches the advertisement, the device 10 may output a positive hedonic haptic effect, or if the user performs a gesture to navigate from the advertisement to a website selling advertised products. In such an embodiment, the device 10 may output a positive hedonic haptic effect throughout the gesture and output a second positive hedonic haptic effect when the user successfully completes the gesture, or a negative hedonic haptic effect if the user incorrectly performs the gesture, or halts the gesture prior to completion, or if the user attempts to close or hide the advertisement. In some embodiments, the haptic effect may be output by way of a haptic widget. For example, one or more haptic widgets may be associated with the advertisement or with a brand associated with the advertisement. In one such embodiment, when the user interacts with the advertisement, the haptic widget may be commanded to output one or more signals to cause brand-specific haptic effects.

In some embodiments of the method 1700, one or more steps may be performed substantially simultaneously, asynchronously, or in different orders. For example, an animated advertisement may be displayed irrespective of any user contact with the advertisement, and haptic effects may be output at any time during the advertisement if the appropriate contact is made or gesture is performed. Further, in some embodiments, fewer than all of the depicted steps may be performed. For example, in one embodiment, the advertisement may be displayed substantially simultaneously with a brand-specific haptic effect while the advertisement is visible within a webpage, but before a user has interacted with it.

Referring again to FIGS. 1A-1C, embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

General Considerations

Use of the conjunction "or" herein is intended to encompass both inclusive and exclusive relationships, or either inclusive or exclusive relationships as context dictates.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments.

Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A computer-readable medium comprising a haptic widget, the haptic widget comprising program code that is executable by a processor to:
    define a positive haptic effect configured to encourage interaction with a virtual object displayed on a display by reducing a perceived coefficient of friction;
    define a negative haptic effect configured to discourage interaction with the virtual object by increasing the perceived coefficient of friction;
    define an interface for the haptic widget;
    receive, via the interface, a play command for the positive haptic effect or the negative haptic effect; and
    output, via the interface, a signal configured to cause the positive haptic effect or the negative haptic effect to be output, the signal being in response to the play command,
    wherein the play command is configured to cause (i) the positive haptic effect to be output based on the virtual object being moved in a first direction, and (ii) the negative haptic effect to be output based on the virtual object being moved in a second direction that is different from the first direction.

2. The computer-readable medium of claim 1, wherein the haptic widget further comprises program code for receiving, via the interface, a configuration of at least one parameter of the haptic widget.

3. The computer-readable medium of claim 2, wherein the play command is a first play command, and wherein the haptic widget further comprises:
    program code defining another haptic effect;
    program code for receiving, via the interface, a second play command for the other haptic effect; and
    program code for outputting, via the interface, a second signal configured to cause the other haptic effect, the second signal based on the at least one parameter and in response to the second play command.

4. The computer-readable medium of claim 1, wherein the haptic widget further comprises:
    program code for receiving, via the interface, a registration command, the registration command configured to cause the haptic widget to register with an operating system.

5. The computer-readable medium of claim 1, wherein the haptic widget further comprises:
    program code for receiving, via the interface, an identification request; and
    program code for providing, via the interface, an identity in response to the identification request.

6. The computer-readable medium of claim 1, wherein the haptic widget further comprises program code that is executable by the processor to output another signal configure to cause a haptic output device to output a brand-specific haptic effect.

7. The computer-readable medium of claim 6, wherein the haptic widget is a brand-specific haptic widget.

8. A method comprising:
    causing, by a processor, an image to be displayed on a touch-screen display;
    identifying, by the processor, a haptic widget that defines (i) a positive haptic effect that is configured to encourage a user to interact with the image by reducing a perceived coefficient of friction, and (ii) a negative haptic effect is configured to discourage the user from interacting with the image by increasing the perceived coefficient of friction; and
    transmitting, by the processor, a first play command to an interface of the haptic widget based on the image being moved in a first direction, the first play command being configured to cause the haptic widget to output a first haptic effect signal, the first haptic effect signal configured to cause the positive haptic effect to be output, and
    transmitting, by the processor, a second play command to an interface of the haptic widget based on the image being moved in a second direction that is different from the first direction, the second play command being configured to cause the haptic widget to output a second haptic effect signal, the second haptic effect signal configured to cause the negative haptic effect to be output.

9. The method of claim 8, further comprising configuring the haptic widget using the interface.

10. The method of claim 8, wherein identifying the haptic widget comprises transmitting a command to the interface and receiving an identification of the haptic widget from the interface in response to the command.

11. The method of claim 10, wherein the identification comprises a brand name, trademark, logo, or a company name.

12. The method of claim 10, further comprising associating the haptic widget with the image to enable the haptic widget to produce haptic effects in response to interactions with the image.

13. The method of claim 10, further comprising associating the haptic widget with a second widget, wherein an interaction with the second widget causes the haptic widget to output a signal configured to cause a haptic effect.

14. The method of claim 13, wherein the first play command or the second play command is transmitted by the second widget.

15. A method comprising:
    displaying, by a processor and via a display device, an advertisement;
    receiving, by the processor, an input associated with the advertisement; and
    based on the input, generating, by the processor, a signal configured to cause a hedonic haptic effect to be output,
    wherein the hedonic haptic effect includes a positive haptic effect configured to encourage a user to interact with the advertisement displayed on the display device by reducing a perceived coefficient of friction, or a negative haptic effect configured to discourage the user from interacting with the advertisement by increasing the perceived coefficient of friction, and
    wherein the positive haptic effect is output based on at least part of the advertisement being moved in a first direction and the negative haptic effect is output based on at least part of the advertisement being moved in a second direction that is different from the first direction.

16. The method of claim 15, wherein the input comprises a gesture.

17. The method of claim 15, wherein the hedonic haptic effect is the positive haptic effect.

18. The method of claim 15, wherein the hedonic haptic effect is the negative haptic effect.

19. The method of claim 15, wherein the hedonic haptic effect provides pseudo-force feedback such that increased effort is required to complete an action.

20. The method of claim 19, wherein the hedonic haptic effect is configured to indicate a direction of movement different than a detected movement.

* * * * *